United States Patent
Kundu et al.

(10) Patent No.: US 12,170,985 B2
(45) Date of Patent: Dec. 17, 2024

(54) ENHANCEMENTS OF FREQUENCY DOMAIN RESOURCE ALLOCATION SCHEMES FOR PHYSICAL UPLINK SHARED CHANNEL IN NR-UNLICENSED

(71) Applicant: Apple Inc., Cupertino, CA (US)

(72) Inventors: Lopamudra Kundu, Santa Clara, CA (US); Gang Xiong, Santa Clara, CA (US); Yongjun Kwak, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/865,011

(22) Filed: May 1, 2020

(65) Prior Publication Data
US 2020/0351668 A1    Nov. 5, 2020

Related U.S. Application Data

(60) Provisional application No. 62/842,432, filed on May 2, 2019.

(51) Int. Cl.
*H04W 72/0453* (2023.01)
*H04L 1/1607* (2023.01)
(Continued)

(52) U.S. Cl.
CPC ....... *H04W 72/0453* (2013.01); *H04L 1/1614* (2013.01); *H04L 5/0092* (2013.01); *H04L 5/0094* (2013.01); *H04W 16/14* (2013.01); *H04W 72/21* (2023.01); *H04W 74/0808* (2013.01); *H04W 80/08* (2013.01)

(58) Field of Classification Search
CPC .............................................. H04W 72/0453
See application file for complete search history.

(56) References Cited

U.S. PATENT DOCUMENTS

2019/0349178 A1* 11/2019 Jia .................... H04L 5/0094
2020/0314842 A1* 10/2020 Bhattad ............ H04W 74/0808
(Continued)

FOREIGN PATENT DOCUMENTS

CN       106664186       5/2017
CN       108702346      10/2018
(Continued)

OTHER PUBLICATIONS

Office Action CN Patent Application No. 202080032238.6; Mar. 16, 2024.
International Search Report and Written Opinion for International Patent Application No. PCT/US2020/031105 mailed Jul. 16, 2020, 17 pgs.
(Continued)

*Primary Examiner* — Jason E Mattis
(74) *Attorney, Agent, or Firm* — Kowert, Hood, Munyon, Rankin & Goetzel, P.C.

(57) ABSTRACT

Apparatuses, systems, and methods for providing frequency domain resource allocation schemes for use in unlicensed spectrum. A wireless device may determine a frequency domain resource allocation scheme for use for uplink communication in unlicensed spectrum. The wireless device may receive information indicating a frequency domain resource allocation for an uplink communication in unlicensed spectrum in accordance with the frequency domain resource allocation scheme. The wireless device may perform the uplink communication using the indicated frequency domain resource allocation.

20 Claims, 19 Drawing Sheets

(51) Int. Cl.
*H04L 5/00* (2006.01)
*H04W 16/14* (2009.01)
*H04W 72/21* (2023.01)
*H04W 74/0808* (2024.01)
*H04W 80/08* (2009.01)

(56) References Cited

U.S. PATENT DOCUMENTS

| | | | | |
|---|---|---|---|---|
| 2021/0251005 | A1* | 8/2021 | Pan | H04W 72/1268 |
| 2021/0352672 | A1* | 11/2021 | Wu | H04W 16/14 |
| 2021/0400696 | A1* | 12/2021 | Maki | H04W 72/04 |
| 2022/0022256 | A1* | 1/2022 | Li | H04W 72/0453 |

FOREIGN PATENT DOCUMENTS

| | | |
|---|---|---|
| CN | 109156001 | 1/2019 |
| WO | 2018072058 A1 | 4/2018 |

OTHER PUBLICATIONS

NEC: "Frequency and time resource allocation schemes for NR", 3GPP Draft; R1-1707200 Freq-Time Resource Allocation Schemes_V1 B, 3rd Generation Partnership Project (3GPP), Mobile Competence Centre ; 650, Route Des Lucioles ; F-06921 Sophia-Antipolis Cedex; Franc vol. RAN WG1, No. Hangzhou; May 15, 2017-May 19, 2017 May 14, 2017 (May 14, 2017), XP051272415, Retrieved from the Internet: URL:http://www.3gpp.org/ftp/Meetings_3GPP SYNC/RAN1/Docs/[retrieved on May 14, 2017], 5 pgs.
International Search Report and Written Opinion for PCT/US2020/031105; Jul. 16, 2020.
NEC "Frequency and time resource allocation schemes for NR", 3GPP TSG-RAN WG1 Meeting #89 R1-1707200, May 15, 2017.
Sony "Enhancements to Configured Grants in NR-U", 3GPP TSG RAN WG1 Meeting #96bis R1-1904253, Jul. 8, 2019.
VIVO "Discussion on physical UL channel design in unlicensed spectrum", 3GPP TSG RAN WG1 #97 R1-1906129, May 17, 2019.

* cited by examiner

| Interlace Index (I) | SCS = 15 KHz | | Interlace Index | SCS = 30 KHz | |
|---|---|---|---|---|---|
| | Number of PRBs (N) Configuration 1 | Number of PRBs (N) Configuration 2 | | Number of PRBs (N) Configuration 1 | Number of PRBs (N) Configuration 2 |
| 0 | 10 | 11 | 0 | 10 | 11 |
| 1 | 10 | 11 | 1 | 10 | 10 |
| 2 | 10 | 11 | 2 | 10 | 10 |
| 3 | 10 | 11 | 3 | 10 | 10 |
| 4 | 10 | 11 | 4 | - | 10 |
| 5 | 10 | 10 | - | - | - |
| 6 | 10 | 10 | - | - | - |
| 7 | 10 | 10 | - | - | - |
| 8 | 10 | 10 | | | |
| 9 | 10 | 10 | | | |

*FIG. 8*

| $RIV - N_{RBG}(N_{RBG} + 1)/2$ | $RB_{START}$ | $l$ |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

FIG. 9

ENHANCEMENTS OF FREQUENCY DOMAIN RESOURCE ALLOCATION SCHEMES FOR PHYSICAL UPLINK SHARED CHANNEL IN NR-UNLICENSED

PRIORITY INFORMATION

This application claims priority to U.S. provisional patent application Ser. No. 62/842,432, entitled "ENHANCEMENTS OF FREQUENCY DOMAIN RESOURCE ALLOCATION SCHEMES FOR PHYSICAL UPLINK SHARED CHANNEL IN NR-UNLICENSED," filed May 2, 2019, which is hereby incorporated by reference in its entirety as though fully and completely set forth herein.

FIELD

The present application relates to wireless devices, and more particularly to apparatus, systems, and methods for providing frequency domain resource allocation schemes for use in unlicensed spectrum in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for providing frequency domain resource allocation schemes for use in unlicensed spectrum in a wireless communication system.

According to the techniques described herein, a wireless device (e.g., a cellular base station or a user equipment device) may determine a frequency domain resource allocation scheme that is in use for uplink communication in unlicensed spectrum, potentially from multiple possible frequency domain resource allocation schemes, such as a bitmap based scheme or a resource indication value based scheme. The wireless device may determine which scheme is in use, as well as various parameters of the scheme, based on higher layer signaling received from a cellular network to which it is attached, and/or based on any of a variety of other possible considerations.

Once the wireless device has determined the frequency domain resource allocation scheme that is in use for uplink communication in unlicensed spectrum, the wireless device may receive information indicating a frequency domain resource allocation for an uplink communication in unlicensed spectrum in accordance with the determined frequency domain resource allocation scheme. From this information, the wireless device may be able to determine which frequency domain resources are allocated to the wireless device for the uplink transmission in the unlicensed spectrum, and may be able to perform the uplink transmission using the allocated frequency domain resources.

The techniques described herein may be implemented in and/or used with a number of different types of devices, including but not limited to unmanned aerial vehicles (UAVs), unmanned aerial controllers (UACs), cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 8 is a table illustrating possible sets of interlace allocation configurations, according to some embodiments;

FIG. 9 is a table illustrating a possible set of resource indication values that can be configured for indicating interlace allocations, according to some embodiments;

Figure 1:
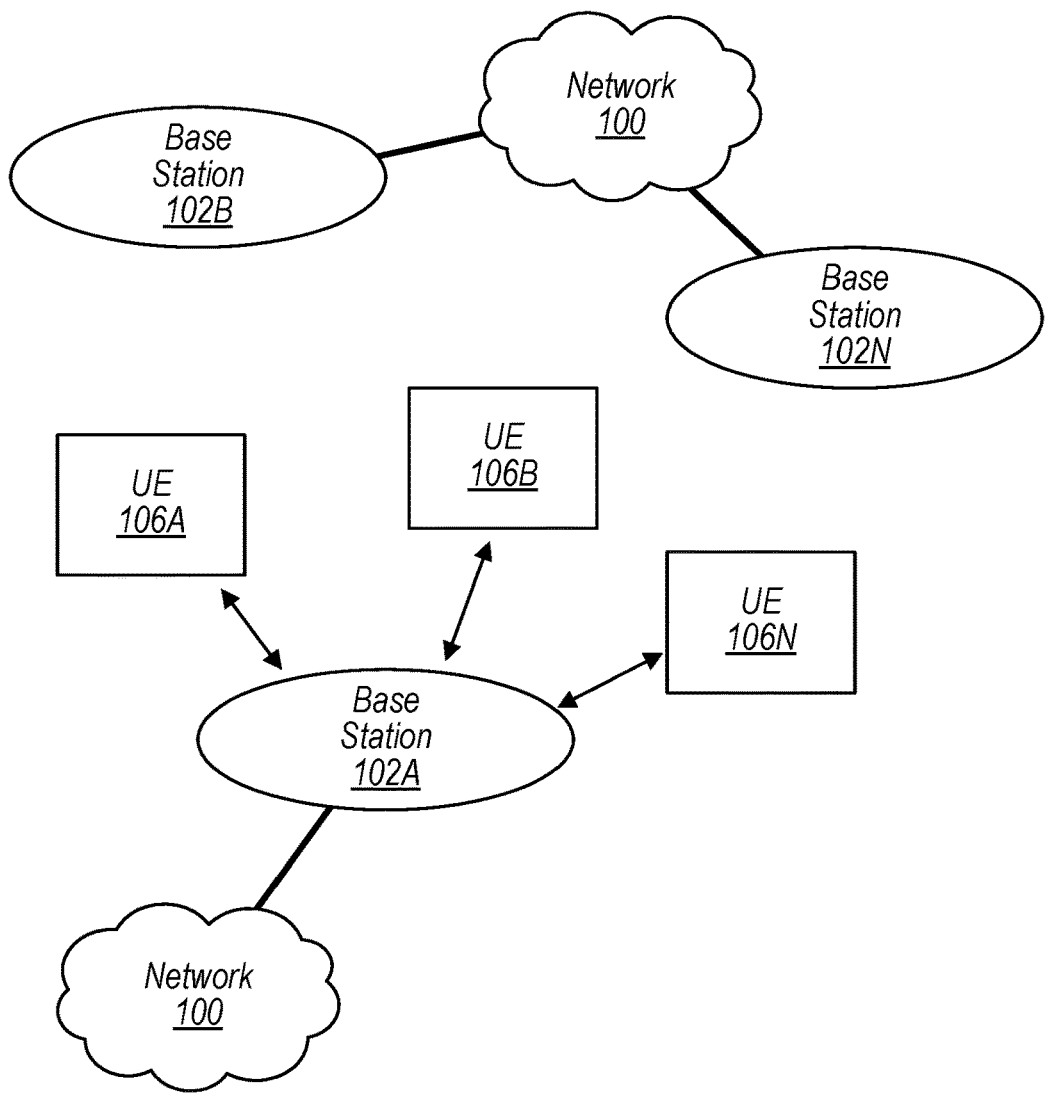
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
4G: Fourth Generation
5G: Fifth Generation
Rel: Release
NW: Network
RF: Radio Frequency
UE: User Equipment
BS: Base Station
gNB: Next Generation NodeB
GSM: Global System for Mobile Communication
UMTS: Universal Mobile Telecommunication System
LTE: Long Term Evolution
NR: New Radio
NR-U: NR Unlicensed
RAT: Radio Access Technology
TX: Transmission/Transmit
RX: Reception/Receive
UL: Uplink
DL: Downlink
CORESET: Control Resource Set
LBT: Listen Before Talk
MCOT: Maximum Channel Occupancy Time
CWS: Contention Window Size
HARQ: Hybrid Automatic Repeat Request
ACK: Acknowledgement
NACK: Negative Acknowledgement Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
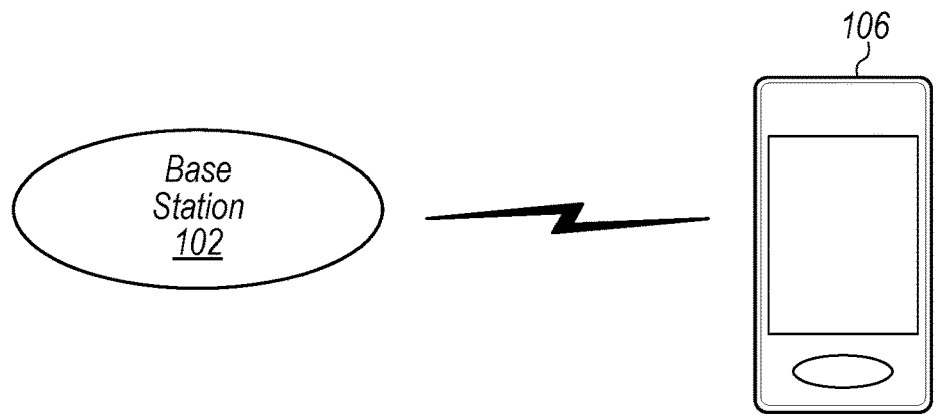
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, an unmanned aerial vehicle (UAV), an unmanned aerial controllers (UAC), an automobile, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
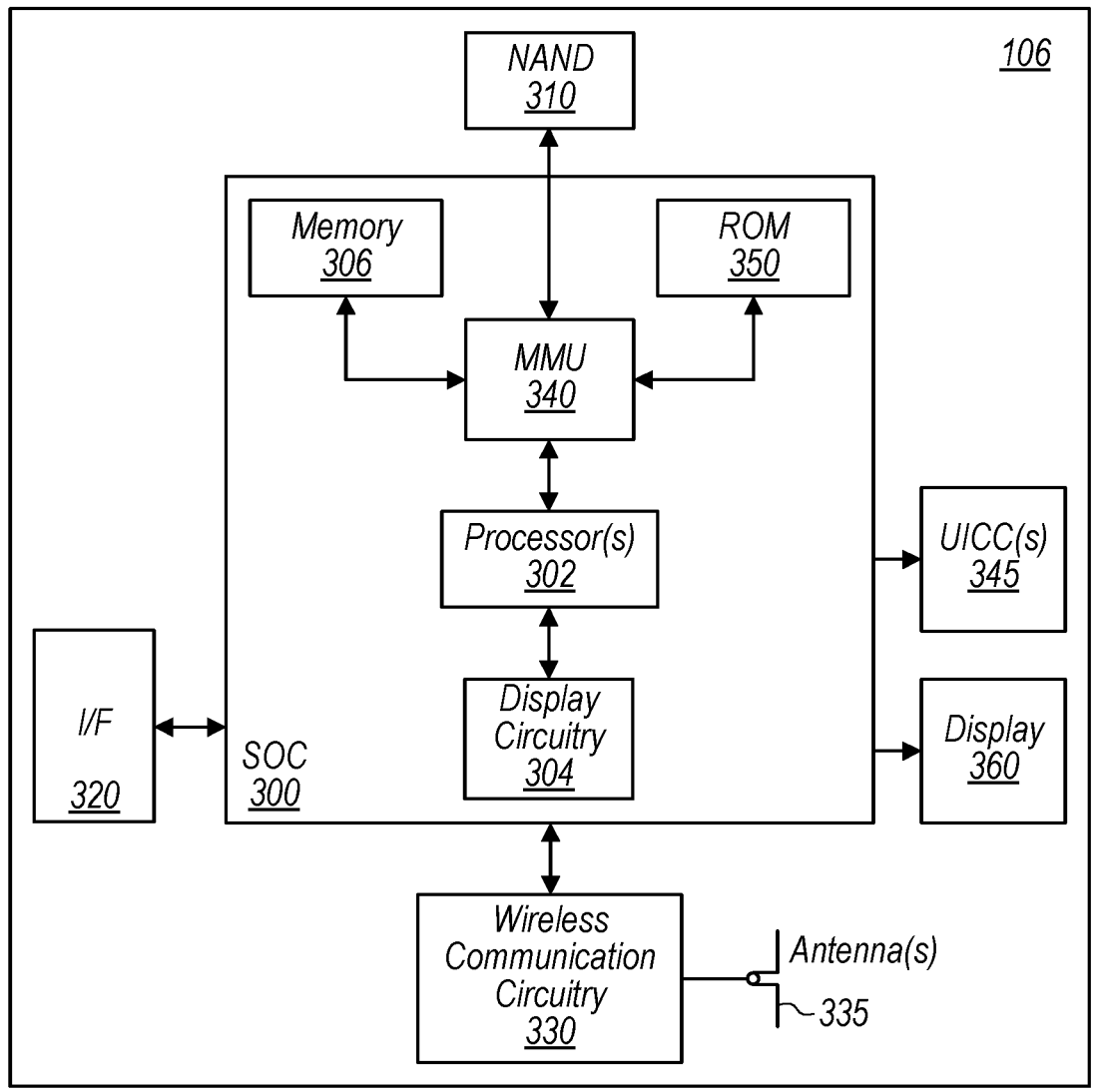
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for
implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
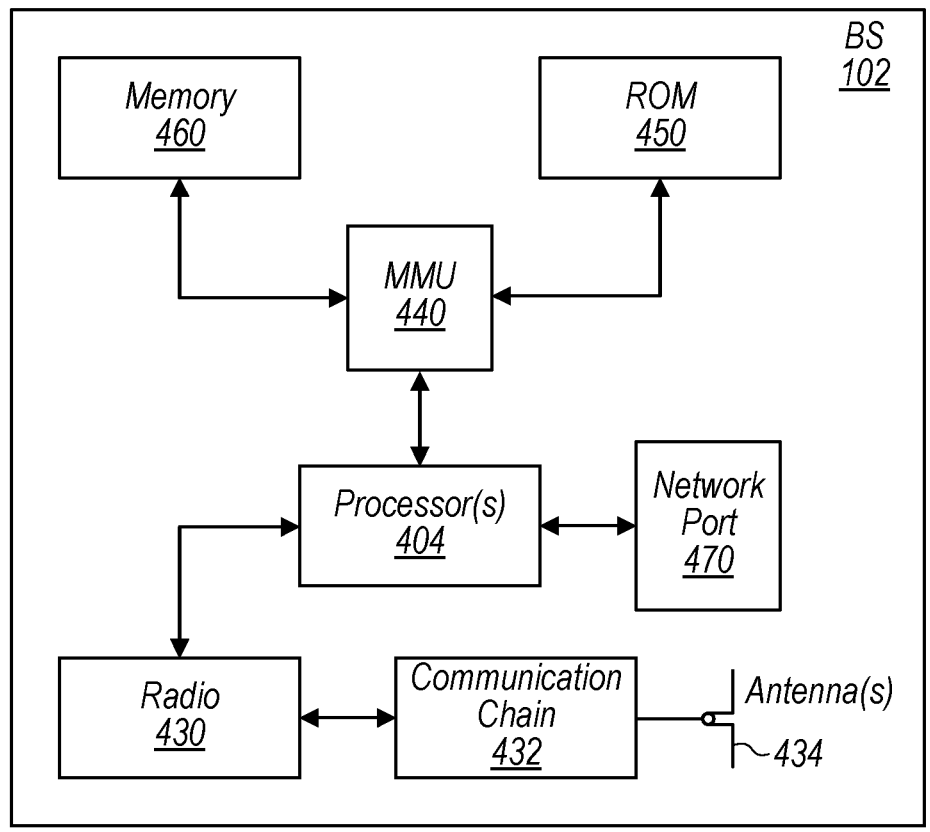
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
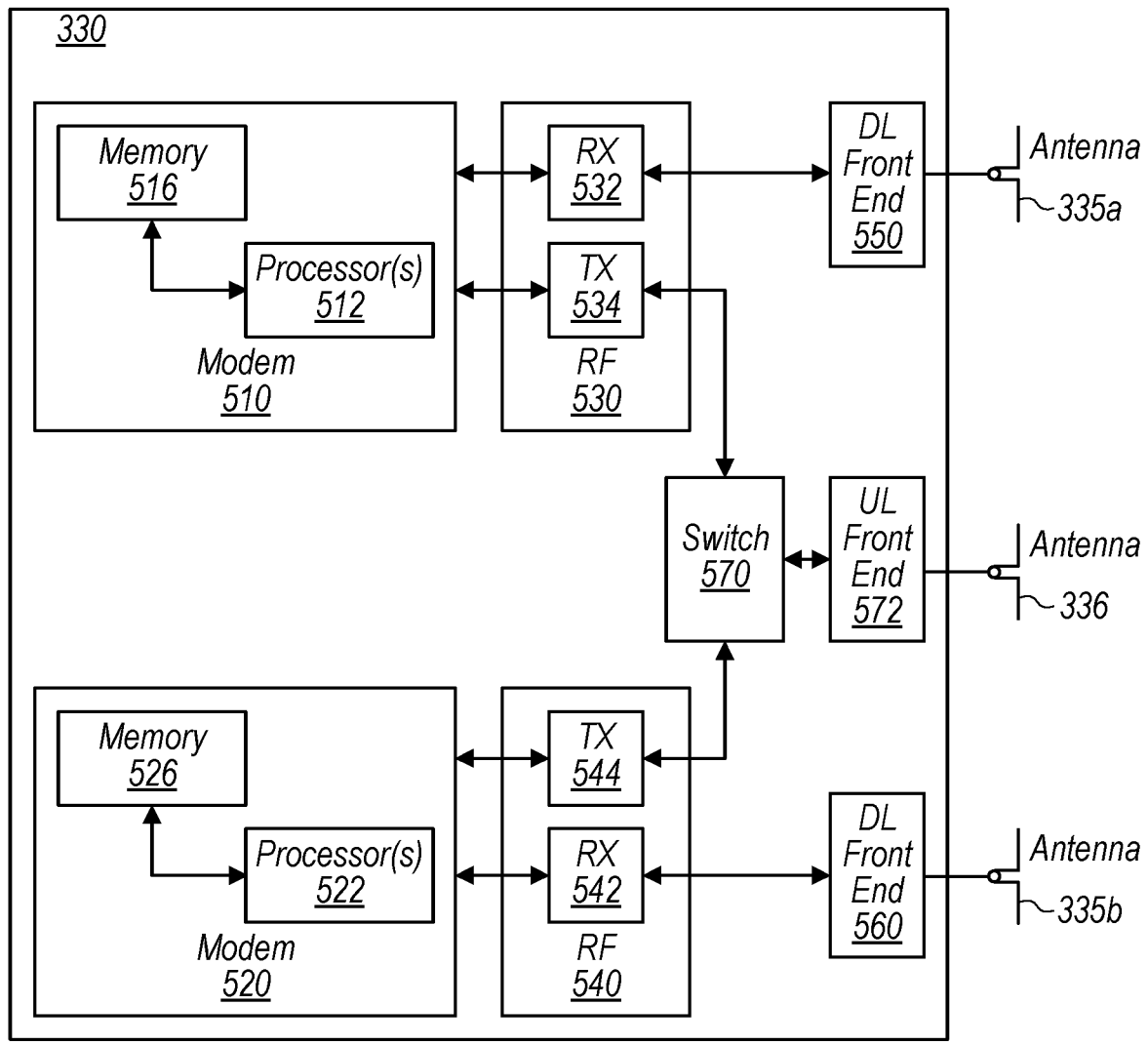
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
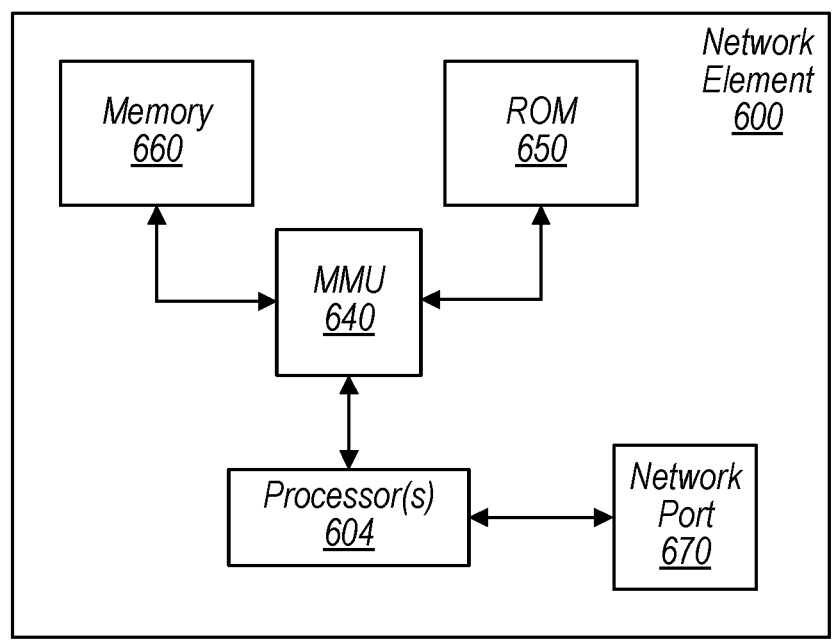
FIG. 6 illustrates an example block diagram of a network element, according to some embodiments.

FIG. 6—Exemplary Block Diagram of a Network Element

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
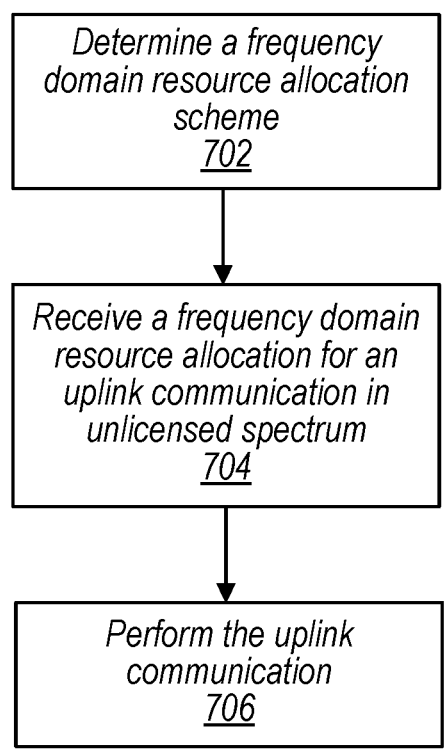
FIG. 7 is a flowchart diagram illustrating aspects of an example frequency domain resource allocation scheme for use in unlicensed spectrum in a wireless communication system; according to some embodiments.

FIG. 7—Frequency Domain Resource Allocation for Uplink Communication in Unlicensed Spectrum New cellular communication techniques are continually under development, to increase coverage, to better serve the range of demands and use cases, and for a variety of other reasons. As new cellular communication technologies is developed and deployed, certain features may be included that are new or differ from previously developed and deployed cellular communication technologies.

Use of unlicensed spectrum is one area of active development for cellular communication technologies. The features of cellular communication techniques that are employed in unlicensed spectrum may differ from the features of cellular communication techniques that are employed in licensed spectrum, e.g., at least in part. For example, in order to ensure fair co-existence with other users of the unlicensed spectrum (e.g., that may not be present in licensed spectrum), certain techniques (e.g., such as use of listen-before-talk procedures before transmitting, implementing maximum channel occupancy time limits, etc.) may be employed to reduce the likelihood of collisions and/or increase the likelihood that the various users of the spectrum are able to obtain fair access to the wireless communication medium.

Such techniques may in turn impact other aspects of cellular communication systems, such as how uplink resource allocation is performed, at least in some embodiments. Accordingly, it may be useful to provide techniques for performing uplink resource allocation in unlicensed spectrum in a cellular communication system.

FIG. 7 is a flowchart diagram illustrating an example of such a method for providing frequency domain resource allocations for uplink communication in unlicensed spectrum in a wireless communication system, at least according to some embodiments. Aspects of the method of FIG. 7 may be implemented by a wireless device such as a UE 106 illustrated in various of the Figures herein, a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

In 702, a wireless device may determine a frequency domain resource allocation scheme for use for uplink communication in unlicensed spectrum, for example in conjunction with a 5G NR wireless cellular network with which the wireless device forms a cellular link. The frequency domain resource allocation scheme may be bitmap based or resource indication value (MV) based, among various possibilities.

For a bitmap based scheme, at least as one possibility, a certain number ($N_{RBG}$) of resource block groups (RBGs) may be configured, each of which may correspond to a set of frequency domain resources. For example, each RBG may include a (potentially virtual/non-contiguous in the frequency domain) set of physical resource blocks (PRBs), which, according to an interlace based structure, may correspond to one or more than one interlace. Additionally, a table (or other data structure) may be configured that associates various interlace indices with these sets of frequency domain resources; for example, each row of a pre-configured table (e.g., having $N_{RBG}$ rows) could correspond to a specified set of frequency domain resources (e.g., a RBG). Thus, a bitmap of size $N_{RBG}$ bits, in which each bit can be toggled to indicate whether an interlace index (and thus a RBG associated with the interlace index according to the pre-configured table) is allocated to a wireless device, could be used to indicate a frequency domain resource allocation for the wireless device.

For a RIV based scheme, the information indicating the frequency domain resource allocation may include a RIV, which may indicate a starting PRB for the frequency domain resource allocation and a number of frequency domain resource interlaces allocated to the wireless device. For example, the wireless device may be able to determine the starting PRB for the frequency domain resource allocation and the frequency domain resource interlaces allocated to the wireless device from the RIV using a formula configured for determining the set of allocated resource blocks from a RIV.

Note that any number of various possible parameters may be configured in conjunction with such a frequency domain resource allocation scheme. Such parameters may be indicated by higher layer signaling, may be fixed according to standard specification documents, may be implicitly determined based on certain other configured parameters (e.g., subcarrier spacing for the cellular communication system, etc.), and/or may be determined in any of various other ways, according to various embodiments. Note further any of various possible combinations of such techniques for dynamically or statically configuring the various possible parameters may be used, e.g., such that it may be possible for certain parameters to be configured in different ways than other parameters, if desired. Such parameters may include whether to use a uniform interlace configuration or a non-uniform interlace configuration, a starting PRB index, a nominal number of PRBs per interlace, and/or one or more allocated interlace indices, among various other possible parameters. In some instances, the type of frequency domain resource allocation scheme used (e.g., bitmap based or RIV based) may be signaled by higher layer signaling and/or otherwise configured according to any of various other possible configuration mechanisms.

In 704, the wireless device may receive information indicating a frequency domain resource allocation for an uplink communication in unlicensed spectrum. The information may be received in accordance with the determined frequency domain resource allocation scheme. Thus, for example, if a bitmap based scheme is configured, the wireless device may receive a bitmap indicating which interlace indices are allocated to the wireless device, and may determine the frequency domain resource allocation accordingly. As another example, if a RIV based scheme is configured, the wireless device may receive a RIV and may translate the RIV to the set of interlace indices that are allocated to the wireless device.

Note that in some instances, the active uplink bandwidth part for the uplink communication may have a greater bandwidth than a LBT bandwidth for the unlicensed spectrum. In such a scenario, there may be a variety of possible approaches that can be taken to extending the frequency domain resource allocation scheme to the full bandwidth of the active uplink bandwidth part.

As one such possibility, the information indicating the frequency domain resource allocation for the uplink communication may indicate a frequency domain resource allocation associated with a primary LBT subband of the active uplink bandwidth part. The information may further indicate one or more LBT subbands (e.g., using a bitmap having a size equal to the number of LBT subbands in the active uplink bandwidth part, or using a signaling mechanism for indicating a chunk of contiguous LBT subbands, among various options) of the active uplink bandwidth part that each have the same frequency domain resource allocation as the primary LBT subband of the active uplink bandwidth part. In such a scenario, the wireless device may perform LBT procedures on each of the LBT subbands with frequency domain resources allocated to the wireless device, and perform the transmission using those allocated frequency domain resources in LBT subbands for which the LBT procedure succeeds, at least according to some embodiments.

As another possibility, the information indicating the frequency domain resource allocation for the uplink communication may indicate a frequency domain resource allocation spanning the entire active uplink bandwidth part, e.g., using a bitmap or RIV based scheme. In such a scenario, the wireless device may perform LBT procedures on each of the LBT subbands of the active bandwidth part, and perform the transmission using those allocated frequency domain resources if LBT procedures for all of the LBT subbands succeed, at least according to some embodiments. Further, at least in some instances, according to such a scenario, it may be the case that the wireless device does not perform the uplink transmission if LBT does not succeed on any of the LBT subbands.

Note that in such a scenario (and possibly in one or more other scenarios in which the active uplink bandwidth part has a bandwidth that is greater than the LBT bandwidth for the unlicensed spectrum), it may be the case that the frequency domain resource allocation includes one or more physical resource blocks mapped on one or more guard bands in between adjacent LBT subbands within the active uplink bandwidth part.

In 706, the wireless device may perform the uplink communication using the indicated frequency domain resource allocation. This may include, for example, transmitting uplink signals that include a physical uplink control channel (PUCCH) and/or physical uplink shared channel (PUSCH), such as according to 5G NR, at least according to some embodiments.

Thus, using the techniques of FIG. 7, it may be possible to provide a frequency domain resource allocation scheme for use for uplink communication in unlicensed spectrum, at least according to some embodiments.

FIGS. 8-20 and Additional Information

FIGS. 8-20 illustrate further aspects that might be used in conjunction with the method of FIG. 7 if desired. It should be noted, however, that the exemplary details illustrated in and described with respect to FIGS. 8-20 are not intended to be limiting to the disclosure as a whole: numerous variations and alternatives to the details provided herein below are possible and should be considered within the scope of the disclosure.

Mobile communication has advanced remarkably in the past two decades: emerging from early voice systems and transforming into today's highly sophisticated integrated communication platforms. The next generation wireless communication system, 5G, or new radio (NR) may provide ubiquitous connectivity and access to information, as well as ability to share data, around the globe. NR is expected to be a unified framework that will target to meet versatile, and sometimes conflicting, performance criteria and provide services to vastly heterogeneous application domains ranging from Enhanced Mobile Broadband (eMBB) to massive Machine-Type Communications (mMTC) and Ultra-Reliable Low-Latency Communications (URLLC), to name a few.

One major enhancement for LTE in Rel-13 had been to enable the operation of cellular networks in unlicensed spectrum, via Licensed-Assisted-Access (LAA). Ever since, exploiting such access to unlicensed spectrum has been considered by 3GPP as a promising approach to coping with the ever increasing growth of wireless data traffic. An important consideration for LTE to operate in unlicensed spectrum may include ensuring fair co-existence with incumbent systems like wireless local area networks (WLANs), which has been a focus of LAA standardization effort since Rel. 13.

Following the trend of LTE enhancements, work on NR based access to unlicensed spectrum (NR-unlicensed) has been started in 3GPP Rel-16. An objective for such work may include to develop additional functionalities that are needed for a physical (PHY) layer design of NR to operate in unlicensed spectrum. It may be the case that coexistence methods already defined for LTE-based LAA context could be assumed as the baseline for the operation of NR-unlicensed systems, with enhancements over these existing methods also being considered. As one possible objective, NR-based operation in unlicensed spectrum should not impact deployed Wi-Fi services (data, video and voice services) more than an additional Wi-Fi network on the same carrier.

The channel access mechanism aspect may be one of the fundamental building blocks for NR-unlicensed. The adoption of Listen-Before-Talk (LBT) in LTE based LAA system helps support achieving fair coexistence with the neighboring systems sharing the unlicensed spectrum in addition to fulfilling the regulatory requirements. To fulfill regulatory requirements and provide a global solution with a unified framework, it may be the case that NR-based unlicensed access will also use LBT based channel access mechanisms. Due to LBT, the performance of uplink (UL) transmissions, including on the physical uplink shared channel (PUSCH), can be impacted, while operating in unlicensed spectrum. For example, it may be the case that LBT needs to be performed at the User Equipment (UE) side before uplink data and/or Uplink Control Information (UCI) can be transmitted on PUSCH. For scheduled UL transmissions, it may further be the case that multiple rounds of contentions are imposed, since LBT may need to be performed at the base station side as well, e.g., before sending the UL grant for PUSCH transmission. Reuse of a resource allocation scheme for PUSCH transmission in NR-licensed systems, which may not need to cope with such channel access related contention, therefore, may not be sufficient for PUSCH transmission in unlicensed spectrum.

Accordingly, this disclosure describes various possible NR-PUSCCH resource allocation schemes, e.g., to cope with LBT and fulfill regulatory requirements in unlicensed spectrum.

In LTE enhanced Licensed Assisted Access (eLAA), a block-interleaved frequency division multiple access (B-IF-DMA) based interlace structure was adopted for the design of physical uplink shared channel (PUSCH). The baseline interlace structure may include use of 10 physical resource blocks (PRBs) per interlace for 15 and 30 KHz subcarrier spacing (SCS) and 20 MHz bandwidth (BW), e.g., to meet occupied channel bandwidth (OCB) requirements and exploit power spectral density (PSD) limitations imposed by regulation.

According to such a structure, uplink resource allocation type 3 (resource indication value (MV) based) may be used for frequency domain resource allocation of the interlace based PUSCH, while in the time domain, multiple starting and ending positions in a subframe may be enabled, e.g., using additional configuration of starting and ending partial subframes via three modes of operations.

At least according to some embodiments, NR may support various numerologies (e.g., BW-SCS combinations beyond 20 MHz-15/30 KHz) and hence, an interlace design for NR-U PUSCH may be more complicated than what was adopted for LTE (e.g., non-uniform interlace, and potentially partial interlace for wideband operation). Therefore, MV based type 3 UL resource allocation type might not be sufficient for NR-U, especially when NR-U supports wideband operation with more than one LBT subband. Moreover, NR-PUSCH may have much more scheduling flexibility (mini-slot based scheduling, where starting symbol candidate locations could possibly be any symbol within a slot (depending on the mapping type (A/B)). Therefore, it may be beneficial for NR-U to support similar scheduling flexibility as NR, such that further enhancements over LAA' s scheduling flexibility, e.g., in terms of partial starting and ending subframes, may be useful.

Accordingly, this disclosure describes embodiments related to possible frequency domain PUSCH resource allocation schemes, e.g., for enhanced reliability to cope with LBT. Additionally, this disclosure describes embodiments related to possible details of signaling aspects related to such PUSCH resource allocation for NR-U.

Such embodiments may enhance the flexibility and reliability of the NR PUSCH resource allocation scheme to enable its operation over unlicensed spectrum, and/or may provide new signaling mechanisms for the enhancement of NR PUSCH resource allocation, to be used over unlicensed spectrum, at least in some instances.

One set of embodiments may relate to scheduled PUSCH transmissions with bandwidth ≤ LBT bandwidth (e.g., 20 MHz). In one embodiment of the disclosure, uplink resource allocation type 0 for NR (bitmap based) can be enhanced to support frequency domain resource allocation for PUSCH transmission on a set of allocated physical resource blocks (PRBs). The resource block assignment information may include a bitmap indicating the resource block groups (RBGs) that are allocated to the UE, where a RBG is a set of virtual resource blocks. As one example, for an interlace based structure, a RBG refers to a set of non-contiguous PRBs corresponding to one or more than one interlace(s).

In one option, a bitmap of size $N_{RBG}$ bits indicates one or more than one row indices of a pre-configured table that includes $N_{RBG}$ rows, each corresponding to frequency domain resources corresponding to one interlace, using which a UE may be able to implicitly derive the PRB indices assigned to the scheduled interlace(s). Interlaces can be indexed in the order of the increasing frequency of the PUSCH bandwidth part, starting at the lowest frequency. The order of the interlace bitmap may be such that interlace index (0) to interlace index ($N_{RBG}$-1) are mapped from MSB to LSB of the bitmap. Alternatively, the mapping can be LSB to MSB. An interlace index may be allocated to the UE if the corresponding bit value in the bitmap is 1, otherwise it may not be allocated to the UE (i.e. when the corresponding bit value is 0), as one possibility. Thus, in such a scenario, if there are L bits of value "1" in the bitmap, UE is allocated with L interlaces.

In another option, nominal RBG or interlace size (N) may vary among interlace indices and a higher layer parameter may indicate to the UE which configuration to use. As one example, the nominal RBG size P table defined in NR uplink resource allocation type 0 can be modified/enhanced to support configurations of uniform and non-uniform interlace as illustrated in FIG. 8.

FIG. 8 is a table illustrating one example of configuring two different configurations for interlace allocation, viz. uniform interlace (Configuration 1) and non-uniform interlace (Configure 2). Starting PRB index ($RB_{START}$) and inter-PRB separation (M) corresponding to each interlace may be indicated to the UE by higher layers or may be pre-configured in the specification (for example, there may be one-to-one mapping between interlace index in FIG. 8 and ($RB_{START}$) and based on the bitmap value along with $RB_{START}$ and M, the UE may be able to implicitly derive the PRB allocations corresponding to a particular interlace.

In another option, the RBG size (or number of PRBs (N)) configurations in FIG. 8 may be independent of interlace allocation being uniform or non-uniform, and depending on higher layer signaling the UE may be able to implicitly derive N for non-uniform interlace (if indicated) based on the allocated interlace index(s).

In another embodiment, uplink resource allocation type 1 for NR (resource indication value or RIV based) can be enhanced to support frequency domain resource allocation for PUSCH transmission on a set of physical resource blocks. The resource allocation information may indicate to a scheduled UE a set of allocated resource blocks:

$$RB_{START}+l+i\odot N_{RBG}$$

where:

$$N_{RBG}=\lfloor N_{RB}^{UL}/N_{nominal}\rfloor,$$

$$0 \leq RB_{START} < N_{RBG}-1.$$

$$i=[0,1,\ldots,N-1],$$

$$l=0,1,\ldots,L-1; \text{ and}$$

$$1 \leq L \leq N_{RBG}-RB_{START}$$

$N_{nominal}$ may be the nominal number of PRBs per interlace (i.e., for uniform interlace) and $N \geq N_{nominal}$. N can be fixed or can be dependent on higher layer signaling or 1-bit indication in the DCI as to whether uniform or non-uniform interlace is allocated. If uniform interlace is indicated, $N=N_{nominal}$ and if non-uniform interlace is indicated, $$(N_{nominal}+1) \quad \text{If} \quad RB_{START}+l<[N_{RB}^{UL}-(N_{RBG}*N_{nominal})]$$

$N=N_{nominal}$ Otherwise

As an example, for 20 MHz BW and 15 KHz SCS, $N_{RB}^{UL}=106$ (number of PRBs available within scheduled UL BWP), $N_{nominal}=10$ and hence, $N_{RBG}=\lfloor N_{RB}^{UL}/N_{nominal}\rfloor=10$. In this example, if higher layer signaling indicates non-uniform interlace, $N=N_{nominal}+1$ for $RB_{START}+l<6$ (corresponding to the first 6 interlaces with interlace indices 0, 1, . . . , 5) and $N=N_{nominal}$ otherwise, assuming the interlaces being indexed in the order of the increasing frequency of the PUSCH bandwidth part, starting at the lowest frequency. As another example, for 20 MHz BW and 30 KHz SCS, $N_{RB}^{UL}=51$, $N_{nominal}=10$ and hence, $N_{RBG}=\lfloor N_{RB}^{UL}/N_{nominal}\rfloor=5$. In this example, if higher layer signaling indicates non-uniform interlace, $N=N_{nominal}+1$ for $RB_{START}+l<1$ corresponding to the first interlace with interlace index 0 and $N=N_{nominal}$ otherwise.

A resource allocation field in the scheduling grant may include (e.g., consist of) a resource indication value (RIV). For $0 \leq RIV < N_{RBG}(N_{RBG}+1)/2$, the resource indication value may correspond to the starting resource block ($RB_{START}$) and the number of allocated interlaces, L, and may be defined as follows:

If $(L-1) \leq \lfloor N_{RBG}/2 \rfloor$ then $$RIV=N_{RBG}(L-1)+RB_{START}$$

Else $$RIV=N_{RBG}(N_{RBG}-L+1)+(N_{RBG}-1-RB_{START})$$

For $RIV > N_{RBG}(N_{RBG}+1)/2$, the resource indication value may correspond to starting resource block ($RB_{START}$) and a set of values l. For a given $N_{RBG}$, $M=\lceil \log_2[N_{RBG}(N_{RBG}+1)/2] \rceil$ bits are required to indicate $N_{RBG}(N_{RBG}+1)/2$ possible combinations of $N_{RBG}$ consecutive interlace indices via RIV and hence $2^M-N_{RBG}(N_{RBG}+1)/2$ residual values can be used to indicate few combinations of non-consecutive interlace indices. As one example, for 20 MHz BW and 15 KHz SCS, the residual $2^6-55=9$ states can be used to indicate 9 different combinations of contiguous and/or non-contiguous interlaces as shown in FIG. 9.

Figure 10:
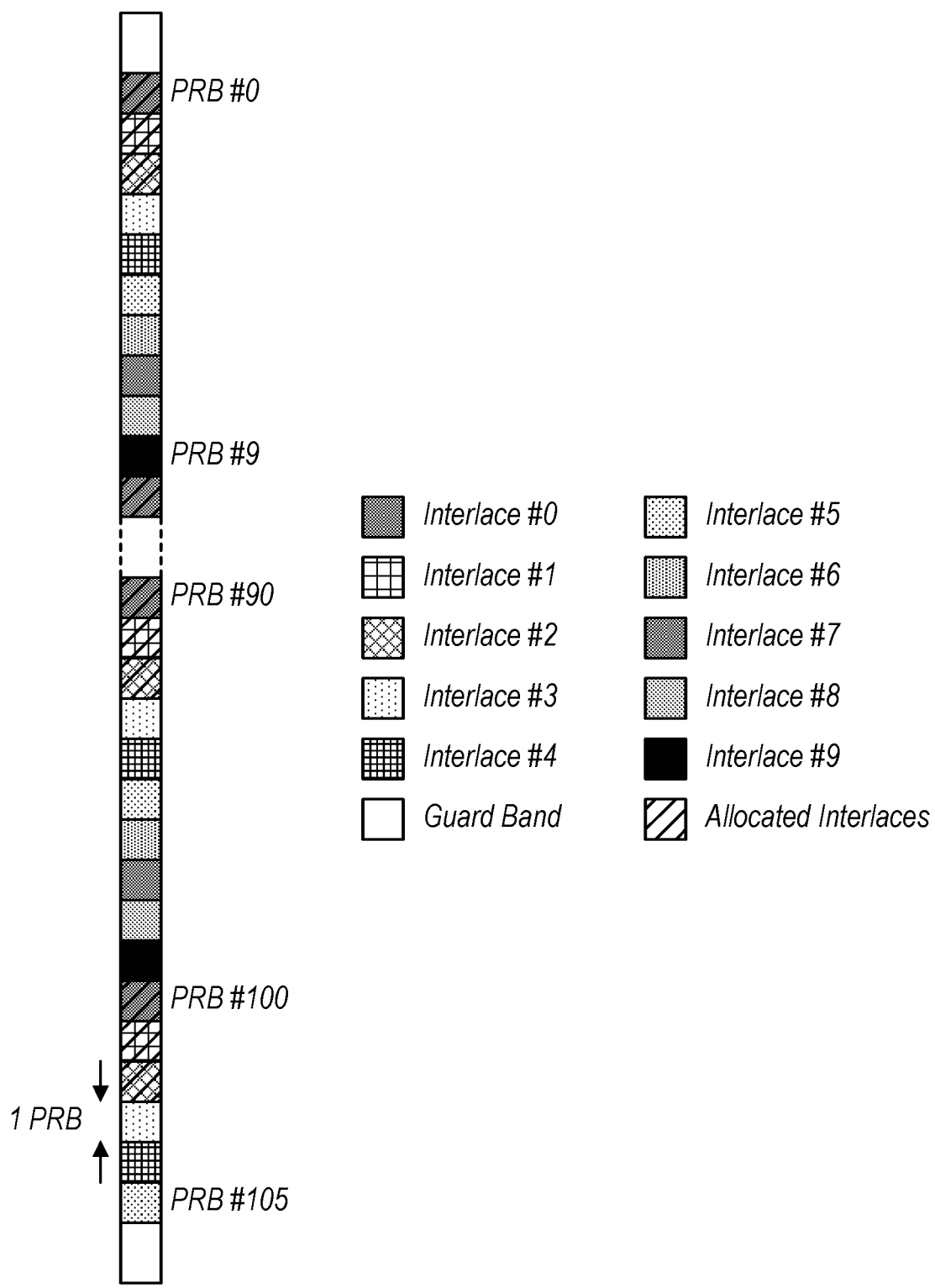
FIG. 10 illustrates an example of a possible frequency domain resource allocation for interlace based PUSCH transmission, according to some embodiments.

FIG. 10 illustrates an example of frequency domain resource allocation for interlace based PUSCH transmission at 15 KHz SCS and 20 MHz SCS, where non-uniform interlace assignment is signaled by higher layer. The allocated interlaces and corresponding PRB indices are shown in FIG. 10. Using a bitmap based approach, the bitmap '1110000000' would indicate the allocation of interlace indices 0,1,2 as shown in FIG. 10 (with lowest interlace index being mapped to the MSB), while RIV=20 (or if expressed using 6-bits, RIV='010100') with {$RB_{START}$=0, L−1=2, $N_{RBG}$=10} would also indicate the illustrated set of resource block allocations (i.e., interlaces 0,1,2).

In another embodiment of the disclosure, the choice between bitmap based frequency domain resource allocations versus RIV based frequency domain resource allocations may depend on higher layer (RRC) signaling.

In another embodiment of the disclosure, the choice between bitmap based frequency domain resource allocations versus RIV based frequency domain resource allocations may depend on subcarrier spacing. For example, a RIV based approach (requiring M-bit) may be used for smaller SCS where M<$N_{RBG}$ (bitmap length), while a bitmap based approach may be used for higher SCS where M≈$N_{RBG}$, e.g., since a bitmap based approach may potentially offer more scheduling flexibility than a RIV based approach.

In another option, either a bitmap based approach or a RIV based approach may be dynamically indicated to the UE and may not depend on which subcarrier spacing is used. In particular, when dynamic switching is enabled by higher layer in pusch-Config, one field in the DCI that provides an UL grant may be used to dynamically switch between bitmap and RIV based approaches for frequency domain resource allocation. If such a mechanism is disabled, it may be the case that the UE would use the bitmap or RIV based approach that has been configured by higher layer in pusch-Config.

In yet another option, either one of these two approaches may be used for PUSCH frequency domain resource allocations in NR-unlicensed, i.e., the supported resource allocation type can be either based on a bitmap approach or a RIV based approach.

Another set of embodiments may relate to scheduled PUSCH transmissions with bandwidth > LBT bandwidth (e.g., 20 MHz), such as may occur in wideband operation, at least in some instances.

In one embodiment of the disclosure, the active UL BWP may be greater than the LBT bandwidth, e.g., 20 MHz for 5 GHz band, (either a single wideband carrier or via carrier aggregation (CA)) and the scheduled PUSCH transmission bandwidth within the UL BWP may include a number n of contiguous or non-contiguous LBT bandwidths.

In one option, a UE may receive an indication (e.g., using higher layer signaling) of a frequency domain resource allocation within one primary LBT subband as per any of the aforementioned embodiments in which scheduled PUSCH transmissions have bandwidth that is less than the bandwidth, and in conjunction, a bitmap of $n_{LBT}$ bits can indicate which of the n LBT subbands amongst the total available $n_{LBT}$ sub-bands are available within the scheduled bandwidth for PUSCH transmission.

As one example, n may be smaller than $n_{LBT}$ if PUSCH transmission is scheduled within a gNB's acquired channel occupancy time (COT), in which due to gNB's LBT failure on certain LBT subbands within the downlink bandwidth part, the available number of LBT subbands for UL transmission n may be smaller than total number of LBT subbands $n_{LBT}$ within the DL BWP. According to various embodiments, the scheduled n LBT subbands may be contiguous or non-contiguous. The $n_{LBT}$-bit bitmap may contain a number n of 1's indicating the LBT subbands (contiguous or non-contiguous) scheduled for PUSCH transmission and UE may use the same frequency allocation indicated for the primary LBT subband on each of the scheduled LBT subbands.

In another option, a UE may receive an indication (e.g., using higher layer signaling) of a frequency domain resource allocation within one primary LBT subband as per any of the aforementioned embodiments in which scheduled PUSCH transmissions have bandwidth that is less than the bandwidth, and in conjunction, [$\log_2[n_{LBT}*(n_{LBT}+1)/2]$] bits can be used to indicate (via RRC signaling or DCI) any n consecutive LBT subbands scheduled for PUSCH transmission. The first LBT subband in the chunk of n contiguous LBT subbands may be signaled separately by higher layers.

As one example, an UL BWP of 60 MHz contains 3 LBT subbands, of which the 2nd and 3rd LBT subbands (where the LBT subbands are indexed from lower to higher frequency) may be scheduled for PUSCH transmission. The subband index of the first scheduled subband, say $SB_{START}$ and the number of subbands ($L_{SB}$) can be indicated by higher layer signaling to the UE. In this case, UE may use the same frequency allocation indicated for the primary LBT subband on each of the scheduled LBT subbands.

In another option, any of the aforementioned embodiments in which scheduled PUSCH transmissions have bandwidth that is less than the bandwidth may be extended to the active UL BWP on which a PUSCH transmission is scheduled. In this case, additional indication of LBT subbands may not be needed. The UE may perform LBT on all $n_{LBT}$ subbands within the active UL BWP and may only perform PUSCH transmission using the indicated frequency domain resources spanned across the active UL BWP if LBT succeeds on all LBT subbands.

In another embodiment of the disclosure, frequency domain resource allocation on a set of physical resource blocks within a single wideband carrier with $n_{LBT}$ sub-bands may include PRBs mapped on guard bands in between the adjacent LBT subbands. A UE may be scheduled with one or more than one wideband interlaces spanning over n contiguous or non-contiguous LBT subbands. Based on whether n=$n_{LBT}$ or, n<$n_{LBT}$ either wideband interlace(s) or truncated version of the wideband interlace(s) (which can alternatively be referred to as "partial interlace(s)) can be used for frequency allocation, where for partial interlace, the allocated physical resource blocks within the guard bands at the edges of partial interlace(s) are punctured. In this case, UE may only perform PUSCH transmission on the allocated frequency domain set of resource blocks when LBT succeeds on all n scheduled LBT subbands.

In another embodiment of the disclosure, frequency domain resource allocation on a set of physical resource blocks within a single wideband carrier with $n_{LBT}$ sub-bands may include PRBs mapped on guard bands between the LBT subbands. Here the guardband can be applied for all LBT subbands inside the scheduled resource.

In another option, the guardband can be applied only for LBT subbands that are adjacent to non-used LBT subbands, where non-used LBT subbands can include any LBT subbands that are not scheduled and any LBT subbands that are not used due to LBT failure.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

A first example may include a method of wireless communication for a fifth generation (5G) new radio (NR) system operating in unlicensed spectrum (NR-unlicensed) comprising: determining, by a UE, a rule of resource allocation for physical uplink control channels (PUSCHs) in frequency domain; and transmitting or causing to transmit, by the UE, one or more uplink (UL) signals using the resource allocation scheme in frequency domains.

A second example may include the method of example 1 or some other example herein, wherein uplink resource allocation type 0 for NR (bitmap based) is enhanced to support frequency domain resource allocation for PUSCH transmission on a set of allocated physical resource blocks (PRBs). The resource block assignment information includes a bitmap indicating the resource block groups (RBGs) that are allocated to the UE, where a RBG is a set of virtual resource blocks.

A third example may include the method of example 2 or some other example herein, wherein a bitmap of size $N_{RBG}$ bits indicates one or more than one row indices of a pre-configured table comprising of $N_{RBG}$ rows, each corresponding to frequency domain resources corresponding to one interlace, using which UE implicitly derives the PRB indices assigned to the scheduled interlace(s). Interlaces are indexed in the order of the increasing frequency of the PUSCH bandwidth part, starting at the lowest frequency. The order of the interlace bitmap is such that interlace index (0) to interlace index ($N_{RBG}-1$) are mapped from MSB to LSB of the bitmap. Alternatively, the mapping is LSB to MSB. An interlace index is allocated to the UE if the corresponding bit value in the bitmap is 1, otherwise it is not allocated to the UE (i.e. when the corresponding bit value is 0). If there are L bits of value "1" in the bitmap, UE is allocated with L interlaces.

A fourth example may include the method of example 2 or some other example herein, wherein UE can implicitly derive the number of PRBs per allocated interlace based on higher layer signaling, e.g. whether to use uniform or non-uniform interlace, whereas other parameters associated with resource allocation like starting PRB index (RB-START), nominal number of PRBs per interlace and the allocated interlace indices are signaled by higher layers.

A fifth example may include the method of example 1 or some other example herein, wherein uplink resource allocation type 1 for NR (resource indication value or RIV based) is enhanced to support frequency domain resource allocation for PUSCH transmission on a set of physical resource blocks. The resource allocation information indicates to a scheduled UE a set of allocated resource blocks $$RB_{START}+l+i\odot N_{RBG}$$

Where, $N_{RBG}=\lfloor N_{RB}^{UL}/N_{nominal}\rfloor$, $0\le RB_{START}<N_{RBG}-1$, $i=[0,1,\ldots,N-1]$, $l=0, 1, \ldots, L-1$ and $1\le L\le N_{RBG}-RB_{START}$. $N_{nominal}$ is the nominal number of PRBs per interlace (i.e. for uniform interlace) and $N\ge N_{nominal}$. N is either fixed or dependent on higher layer signaling or 1-bit indication in the DCI as to whether uniform or non-uniform interlace is allocated. If uniform interlace is indicated, $N=N_{nominal}$ and if non-uniform interlace is indicated, $$N=(N_{nominal}+1) \text{ If } RB_{START}+l<\lfloor N_{RB}^{IL}(N_{nominal})\rfloor$$

$N=N_{nominal}$ Otherwise

A resource allocation field in the scheduling grant consists of a resource indication value (MV). For $0\le RIV<N_{RBG}(N_{RBG}+1)/2$, the resource indication value corresponds to the starting resource block ($RB_{START}$) and the number of allocated interlaces, L and is defined as follows:

If $(L-1)\le\lfloor N_{RBG}/2\rfloor$ then $$RIV=N_{RBG}(L-1)+RB_{START}$$

Else $$RIV=N_{RBG}(N_{RBG}-L+1)+(N_{RBG}-1-RB_{START})$$

For $RIV>N_{RBG}(N_{RBG}+1)/2$, the resource indication value corresponds to starting resource block ($RB_{START}$) and a set of values l. For a given $N_{RBG}$, $M=\lceil\log_2[N_{RBG}(N_{RBG}+1)/2]\rceil$ bits are required to indicate $N_{RBG}(N_{RBG}+1)/2$ possible combinations of $N_{RBG}$ consecutive interlace indices via RIV and hence $2^M-N_{RBG}(N_{RBG}+1)/2$ residual values are used to indicate few combinations of non-consecutive interlace indices to the UE.

A sixth example may include the method of example 1 or some other example herein, wherein the choice between bitmap based frequency domain resource allocations (e.g., according to examples 3 and 4) versus RIV based frequency domain resource allocations (e.g., according to example 5) depends on higher layer (RRC) signaling.

A seventh example may include the method of example 6 or some other example herein, wherein the choice between bitmap based frequency domain resource allocations versus RIV based frequency domain resource allocations depends on subcarrier spacing. For example, RIV based approach (requiring M-bit) is used for smaller SCS where $M<N_{RBG}$ (bitmap length), while bitmap based approach is used for higher SCS where $M\approx N_{RBG}$, since bitmap based approach potentially offers more scheduling flexibility than RIV based approach.

An eighth example may include the method of example 6 or some other example herein, wherein either bitmap based approach or RIV based approach is dynamically indicated to the UE and does not depend on used subcarrier spacing. In particular, when dynamic switching is enabled by higher layer in pusch-Config, one field in the DCI for UL grant is used to dynamically switch between bitmap and RIV based approach for frequency domain resource allocation. If disabled, the UE would use the bitmap or RIV based approach which is configured by higher layer in pusch-Config.

A ninth example may include the method of example 6 or some other example herein, wherein either one of these two approaches is used for PUSCH frequency domain resource allocations in NR-unlicensed, i.e. the supported resource allocation type is either based on bitmap approach or RIV based approach.

A tenth example may include the method of example 1 or some other example herein, wherein the active UL BWP is greater than the LBT bandwidth, e.g., 20 MHz for 5 GHz band, (either a single wideband carrier or via carrier aggregation (CA)) and scheduled PUSCH transmission bandwidth within the UL BWP comprises of n number of contiguous or non-contiguous LBT bandwidths.

An eleventh example may include the method of example 10 or some other example herein, wherein UE is indicated (by higher layer) with frequency domain resource allocation within one primary LBT subband as per the examples in example 2 through 10 and in conjunction, a bitmap of $n_{LBT}$ bits indicates which of the n LBT subbands amongst the total available $n_{LBT}$ sub-bands are available within the scheduled bandwidth for PUSCH transmission.

A twelfth example may include the method of example 10 or some other example herein, wherein UE is indicated (by higher layer) with frequency domain resource allocation within one primary LBT subband as per the examples in example 2 through 10 and in conjunction, $\lceil \log_2[n_{LBT}*(n_{LBT}+1/2)] \rceil$ bits are used to indicate (via RRC signaling or DCI) any n consecutive LBT subbands scheduled for PUSCH transmission. The subband index of the first scheduled subband, say $SB_{START}$ and the number of subbands ($L_{SB}$) are indicated by higher layer signaling to the UE. In this case, UE uses the same frequency allocation indicated for the primary LBT subband on each of the subsequent scheduled LBT subbands.

A thirteenth example may include the method of example 10 or some other example herein, wherein the frequency domain resource allocation methods mentioned in examples 2 through 10 are extended to active UL BWP on which PUSCH transmission is scheduled. In this case, additional indication of LBT subbands is not needed. UE performs LBT on all $n_{LBT}$ subbands within the active UL BWP and only transmits PUSCH using the indicated frequency domain resources spanned across the active UL BWP if LBT succeeds on all LBT subbands.

A fourteenth example may include the method of example 13 or some other example herein, wherein frequency domain resource allocation on a set of physical resource blocks within a single wideband carrier with $n_{LBT}$ sub-bands includes PRBs mapped on guard bands in between the adjacent LBT subbands. UE is scheduled with one or more than one wideband interlaces spanning over n contiguous or non-contiguous LBT subbands. Based on whether $n=n_{LBT}$ or, $n<n_{LBT}$, either wideband interlace(s) or truncated version of the wideband interlace(s) (which can alternatively be referred to as "partial interlace(s)) can be used for frequency allocation, where for partial interlace, the allocated physical resource blocks within the guard bands at the edges of partial interlace(s) are punctured. In this case, UE only transmits PUSCH on the allocated frequency domain set of resource blocks when LBT succeeds on all n scheduled LBT subbands.

A fifteenth example may include the method of example 13 or some other example herein, wherein frequency domain resource allocation on a set of physical resource blocks within a single wideband carrier with $n_{LBT}$ sub-bands includes PRBs mapped on guard bands between the LBT subbands. Here the guardband is applied for all LBT subbands inside the scheduled resource.

A sixteenth example may include the method of example 15 or some other example herein, wherein the guardband is applied only for LBT subbands which are adjacent to non-used LBT subbands, where non-used LBT subbands can include the LBT subband which is not scheduled and the LBT subband which cannot be used due to LBT failure.

A seventeenth example may include a method comprising: receiving a resource allocation including a bitmap, wherein individual bits of the bitmap indicate whether respective resource block groups (RBGs) are allocated to the UE on unlicensed spectrum in a 5G new radio (NR) wireless cellular network, wherein the RBGs are separated in the frequency domain; and transmitting or causing to transmit one or more uplink (UL) signals based on the resource allocation.

An eighteenth example may include the method of example 17 or another example herein, wherein the RBGs are sets of virtual resource blocks.

A nineteenth example may include the method of example 17-18 or some other example herein, the bits of the bitmap correspond to respective interlaces that each include one or more frequency domain resources.

A twentieth example may include the method of example 19 or another example herein, further comprising accessing a table having a plurality of rows corresponding to the respective interlaces, wherein individual rows indicate the frequency domain resources of the respective interlace.

A twenty-first example may include the method of example 19 or some other example herein, further comprising receiving configuration information for the interlaces, the configuration information indicating one or more of a starting PRB index (RB START), a nominal number of PRBs per interlace and/or interlace indexes.

A twenty-second example may include the method of example 21 or another example herein, wherein the configuration information is received via RRC signaling.

A twenty-third example may include the method of example 17-22 or another example herein, further comprising using bitmap-based resource allocation or a resource indication value (RIV)-based resource allocation depending on a subcarrier spacing.

A twenty-fourth example may include the method of example 17-23 or another example herein, wherein the one or more uplink signals include a PUCCH and/or a PUSCH.

A twenty-fifth example may include the method of example 17-24 or another example herein, wherein the method is performed by a UE or a portion thereof.

A twenty-sixth example may include a method comprising: receiving a scheduling grant including a resource indication value (MV) to indicate a set of allocated frequency resources allocated to the UE on unlicensed spectrum in a 5G new radio (NR) wireless cellular network, wherein the RBGs are separated in the frequency domain; transmitting or causing to transmit one or more uplink (UL) signals based on the resource allocation.

A twenty-seventh example may include the method of example 26 or another example herein, wherein the MV corresponds to a starting resource block ($RB_{START}$) and a number of allocated interlaces for the set of allocated frequency resources.

A twenty-eighth example may include the method of example 26-27 or another example herein, further comprising using RIV-based resource allocation or a bitmap-based resource allocation depending on a subcarrier spacing.

A twenty-ninth example may include the method of example 26-28 or another example herein, wherein the one or more uplink signals include a PUCCH and/or a PUSCH.

A thirtieth example may include the method of example 26-29 or another example herein, wherein the method is performed by a UE or a portion thereof.

A thirty-first example may include an apparatus comprising means to perform one or more elements of a method described in or related to any of examples 1-30, or any other method or process described herein.

A thirty-second example may include one or more non-transitory computer-readable media comprising instructions to cause an electronic device, upon execution of the instructions by one or more processors of the electronic device, to perform one or more elements of a method described in or related to any of examples 1-30, or any other method or process described herein.

A thirty-third example may include an apparatus comprising logic, modules, or circuitry to perform one or more elements of a method described in or related to any of examples 1-30, or any other method or process described herein.

A thirty-fourth example may include a method, technique, or process as described in or related to any of examples 1-30, or portions or parts thereof.

A thirty-fifth example may include an apparatus comprising: one or more processors and one or more computer-readable media comprising instructions that, when executed by the one or more processors, cause the one or more processors to perform the method, techniques, or process as described in or related to any of examples 1-30, or portions thereof.

A thirty-sixth example may include a signal as described in or related to any of examples 1-30, or portions or parts thereof.

A thirty-seventh example may include a datagram, packet, frame, segment, protocol data unit (PDU), or message as described in or related to any of examples 1-30, or portions or parts thereof, or otherwise described in the present disclosure.

A thirty-eighth example may include a signal encoded with data as described in or related to any of examples 1-30, or portions or parts thereof, or otherwise described in the present disclosure.

A thirty-ninth example may include a signal encoded with a datagram, packet, frame, segment, protocol data unit (PDU), or message as described in or related to any of examples 1-30, or portions or parts thereof, or otherwise described in the present disclosure.

A fortieth example may include an electromagnetic signal carrying computer-readable instructions, wherein execution of the computer-readable instructions by one or more processors is to cause the one or more processors to perform the method, techniques, or process as described in or related to any of examples 1-30, or portions thereof.

A forty-first example may include a computer program comprising instructions, wherein execution of the program by a processing element is to cause the processing element to carry out the method, techniques, or process as described in or related to any of examples 1-30, or portions thereof.

A forty-second example may include a signal in a wireless network as shown and described herein.

A forty-third example may include a method of communicating in a wireless network as shown and described herein.

A forty-fourth example may include a system for providing wireless communication as shown and described herein.

A forty-fifth example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Systems and Implementations

Figure 11:
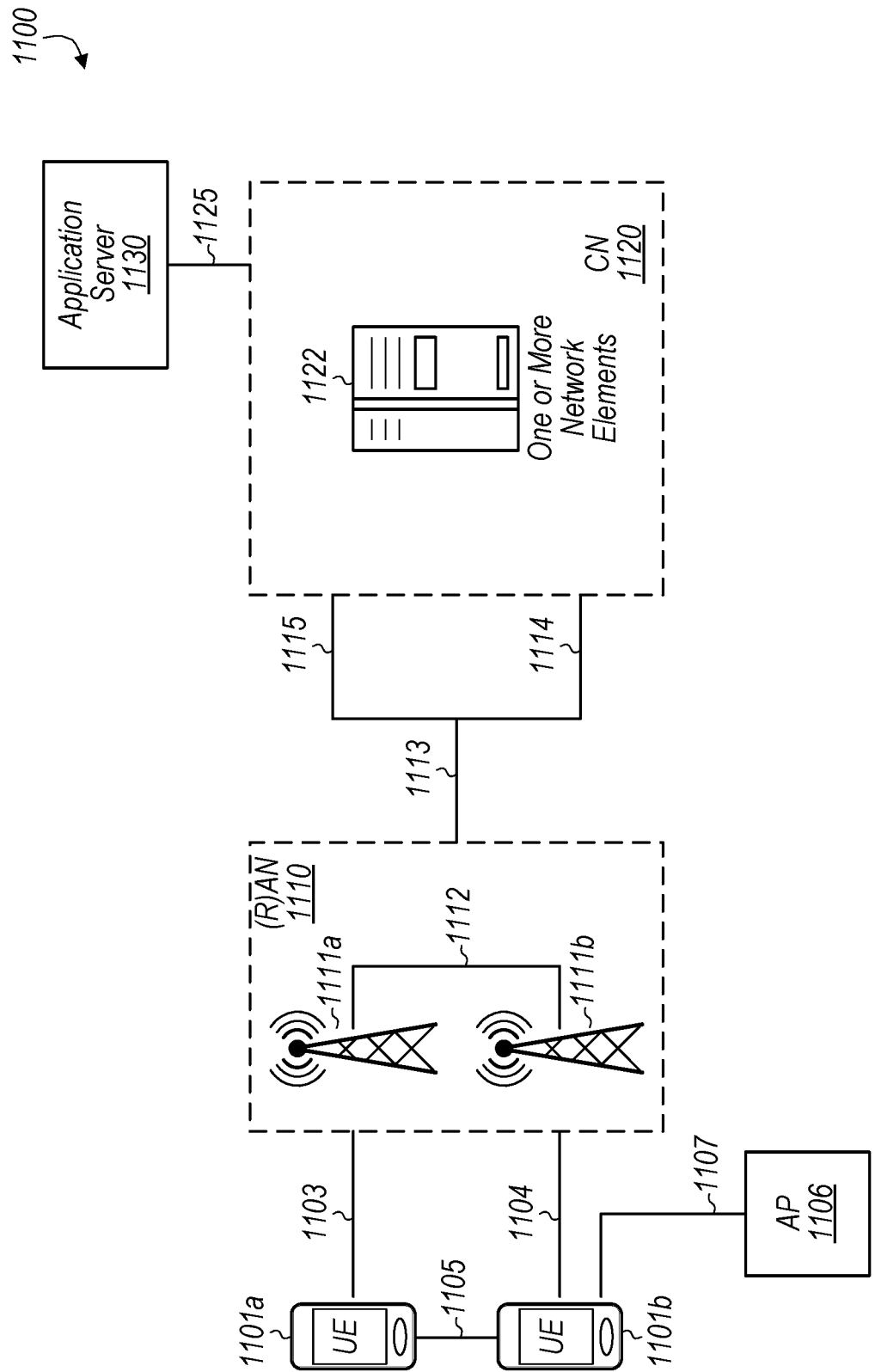
FIG. 11 illustrates an example architecture of a wireless communication system, according to some embodiments.

FIG. 11 illustrates an example architecture of a system 1100 of a network, in accordance with various embodiments. The following description is provided for an example system 1100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 11, the system 1100 includes UE 1101a and UE 1101b (collectively referred to as "UEs 1101" or "UE 1101"). In this example, UEs 1101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 may be configured to connect, for example, communicatively couple, with a RAN 1110. In embodiments, the RAN 1110 may be an NG RAN or a 5G RAN, an E-UTRAN, or a legacy RAN, such as a UTRAN or GERAN. As used herein, the term "NG RAN" or the like may refer to a RAN 1110 that operates in an NR or 5G system 1100, and the term "E-UTRAN" or the like may refer to a RAN 1110 that operates in an LTE or 4G system 1100. The UEs 1101 utilize connections (or channels) 1103 and 1104, respectively, each of which comprises a physical communications interface or layer (discussed in further detail below).

In this example, the connections 1103 and 1104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1101 may directly exchange communication data via a ProSe interface 1105. The ProSe interface 1105 may alternatively be referred to as a SL interface 1105 and may comprise one or more logical channels, including but not limited to a PSCCH, a PSSCH, a PSDCH, and a PSBCH.

The UE 1101b is shown to be configured to access an AP 1106 (also referred to as "WLAN node 1106," "WLAN 1106," "WLAN Termination 1106," "WT 1106" or the like)

via connection 1107. The connection 1107 can comprise a local wireless connection, such as a connection consistent with any IEEE 802.11 protocol, wherein the AP 1106 would comprise a wireless fidelity (Wi-Fi®) router. In this example, the AP 1106 is shown to be connected to the Internet without connecting to the core network of the wireless system (described in further detail below). In various embodiments, the UE 1101b, RAN 1110, and AP 1106 may be configured to utilize LWA operation and/or LWIP operation. The LWA operation may involve the UE 1101b in RRC CONNECTED being configured by a RAN node 1111a-b to utilize radio resources of LTE and WLAN. LWIP operation may involve the UE 1101b using WLAN radio resources (e.g., connection 1107) via IPsec protocol tunneling to authenticate and encrypt packets (e.g., IP packets) sent over the connection 1107. IPsec tunneling may include encapsulating the entirety of original IP packets and adding a new packet header, thereby protecting the original header of the IP packets.

The RAN 1110 can include one or more AN nodes or RAN nodes 1111a and 1111b (collectively referred to as "RAN nodes 1111" or "RAN node 1111") that enable the connections 1103 and 1104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1111 that operates in an NR or 5G system 1100 (for example, a gNB), and the term "E-UTRAN node" or the like may refer to a RAN node 1111 that operates in an LTE or 4G system 1100 (e.g., an eNB). According to various embodiments, the RAN nodes 1111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1111; a MAC/PHY split wherein RRC, PDCP, RLC, and MAC layers are operated by the CRAN/vBBUP and the PHY layer is operated by individual RAN nodes 1111; or a "lower PHY" split wherein RRC, PDCP, RLC, MAC layers and upper portions of the PHY layer are operated by the CRAN/vBBUP and lower portions of the PHY layer are operated by individual RAN nodes 1111. This virtualized framework allows the freed-up processor cores of the RAN nodes 1111 to perform other virtualized applications. In some implementations, an individual RAN node 1111 may represent individual gNB-DUs that are connected to a gNB-CU via individual F 1 interfaces (not shown by FIG. 11). In these implementations, the gNB-DUs may include one or more remote radio heads or RFEMs (see, e.g., FIG. 14), and the gNB-CU may be operated by a server that is located in the RAN 1110 (not shown) or by a server pool in a similar manner as the CRAN/vBBUP. Additionally or alternatively, one or more of the RAN nodes 1111 may be next generation eNBs (ng-eNBs), which are RAN nodes that provide E-UTRA user plane and control plane protocol terminations toward the UEs 1101, and are connected to a 5GC (e.g., CN 1320 of FIG. 13) via an NG interface (discussed infra).

In V2X scenarios one or more of the RAN nodes 1111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1101 (vUEs 1101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1111 can terminate the air interface protocol and can be the first point of contact for the UEs 1101. In some embodiments, any of the RAN nodes 1111 can fulfill various logical functions for the RAN 1110 including, but not limited to, radio network controller (RNC) functions such as radio bearer management, uplink and downlink dynamic radio resource management and data packet scheduling, and mobility management.

In embodiments, the UEs 1101 can be configured to communicate using OFDM communication signals with each other or with any of the RAN nodes 1111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 to the UEs 1101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1101 and the RAN nodes 1111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1101 and the RAN nodes 1111 may operate using LAA, eLAA, and/or feLAA mechanisms. In these implementations, the UEs 1101 and the RAN nodes 1111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1101 RAN nodes 1111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1101, AP 1106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1101. The PDCCH carries information about the transport format and resource allocations related to the PDSCH channel, among other things. It may also inform the UEs 1101 about the transport format, resource allocation, and HARQ information related to the uplink shared channel. Typically, downlink scheduling (assigning control and shared channel resource blocks to the UE 1101b within a cell) may be performed at any of the RAN nodes 1111 based on channel quality information fed back from any of the UEs 1101. The downlink resource assignment information may be sent on the PDCCH used for (e.g., assigned to) each of the UEs 1101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

The RAN nodes 1111 may be configured to communicate with one another via interface 1112. In embodiments where the system 1100 is an LTE system (e.g., when CN 1120 is an EPC 1220 as in FIG. 12), the interface 1112 may be an X2 interface 1112. The X2 interface may be defined between two or more RAN nodes 1111 (e.g., two or more eNBs and the like) that connect to EPC 1120, and/or between two eNBs connecting to EPC 1120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1101 from an SeNB for user data; information of PDCP PDUs that were not delivered to a UE 1101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1100 is a 5G or NR system (e.g., when CN 1120 is a 5GC 1320 as in FIG. 13), the interface 1112 may be an Xn interface 1112. The Xn interface is defined between two or more RAN nodes 1111 (e.g., two or more gNBs and the like) that connect to 5GC 1120, between a RAN node 1111 (e.g., a gNB) connecting to 5GC 1120 and an eNB, and/or between two eNBs connecting to 5GC 1120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1101 in a connected mode (e.g., CM-CONNECTED) including functionality to manage the UE mobility for connected mode between one or more RAN nodes 1111. The mobility support may include context transfer from an old (source) serving RAN node 1111 to new (target) serving RAN node 1111; and control of user plane tunnels between old (source) serving RAN node 1111 to new (target) serving RAN node 1111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1110 is shown to be communicatively coupled to a core network—in this embodiment, core network (CN) 1120. The CN 1120 may comprise a plurality of network elements 1122, which are configured to offer various data and telecommunications services to customers/subscribers (e.g., users of UEs 1101) who are connected to the CN 1120 via the RAN 1110. The components of the CN 1120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1120 may be referred to as a network slice, and a logical instantiation of a portion of the CN 1120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1130 may be an element offering applications that use IP bearer resources with the core network (e.g., UMTS PS domain, LTE PS data services, etc.). The application server 1130 can also be configured to support one or more communication services (e.g., VoIP sessions, PTT sessions, group communication sessions, social networking services, etc.) for the UEs 1101 via the EPC 1120.

In embodiments, the CN 1120 may be a 5GC (referred to as "5GC 1120" or the like), and the RAN 1110 may be connected with the CN 1120 via an NG interface 1113. In embodiments, the NG interface 1113 may be split into two parts, an NG user plane (NG-U) interface 1114, which carries traffic data between the RAN nodes 1111 and a UPF, and the S1 control plane (NG-C) interface 1115, which is a signaling interface between the RAN nodes 1111 and AMFs. Embodiments where the CN 1120 is a 5GC 1120 are discussed in more detail with regard to FIG. 13.

In embodiments, the CN 1120 may be a 5G CN (referred to as "5GC 1120" or the like), while in other embodiments, the CN 1120 may be an EPC). Where CN 1120 is an EPC (referred to as "EPC 1120" or the like), the RAN 1110 may be connected with the CN 1120 via an S1 interface 1113. In embodiments, the S1 interface 1113 may be split into two parts, an S1 user plane (S1-U) interface 1114, which carries traffic data between the RAN nodes 1111 and the S-GW, and the S1-MME interface 1115, which is a signaling interface between the RAN nodes 1111 and MMEs.

Figure 12:
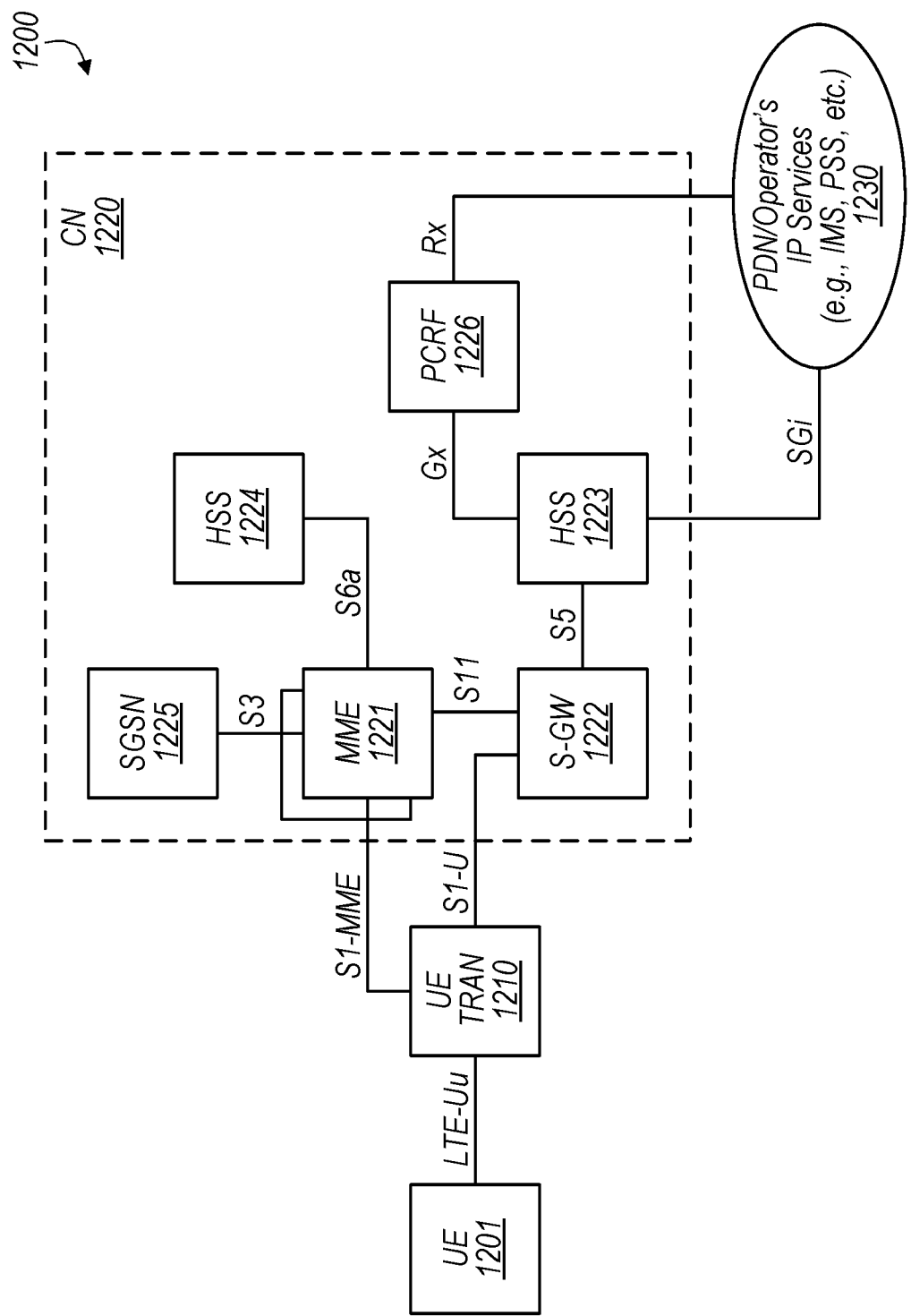
FIG. 12 illustrates an example architecture of a system including a first cellular core network, according to some embodiments

FIG. 12 illustrates an example architecture of a system 1200 including a first CN 1220, in accordance with various embodiments. In this example, system 1200 may implement the LTE standard wherein the CN 1220 is an EPC 1220 that corresponds with CN 1120 of FIG. 11. Additionally, the UE 1201 may be the same or similar as the UEs 1101 of FIG. 11, and the E-UTRAN 1210 may be a RAN that is the same or similar to the RAN 1110 of FIG. 11, and which may include RAN nodes 1111 discussed previously. The CN 1220 may comprise MMEs 1221, an S-GW 1222, a P-GW 1223, a HSS 1224, and a SGSN 1225.

The MMEs 1221 may be similar in function to the control plane of legacy SGSN, and may implement MM functions to keep track of the current location of a UE 1201. The MMEs 1221 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 1201, provide user identity confidentiality, and/or perform other like services to users/subscribers. Each UE 1201 and the MME 1221 may include an MM or EMM sublayer, and an MM context may be established in the UE 1201 and the MME 1221 when an attach procedure is successfully completed. The MM context may be a data structure or database object that stores MM-related information of the UE 1201. The MMEs 1221 may be coupled with the HSS 1224 via an S6a reference point, coupled with the SGSN 1225 via an S3 reference point, and coupled with the S-GW 1222 via an S11 reference point.

The SGSN 1225 may be a node that serves the UE 1201 by tracking the location of an individual UE 1201 and performing security functions. In addition, the SGSN 1225 may perform Inter-EPC node signaling for mobility between 2G/3G and E-UTRAN 3GPP access networks; PDN and S-GW selection as specified by the MMEs 1221; handling of UE 1201 time zone functions as specified by the MMEs 1221; and MME selection for handovers to E-UTRAN 3GPP access network. The S3 reference point between the MMEs 1221 and the SGSN 1225 may enable user and bearer information exchange for inter-3GPP access network mobility in idle and/or active states.

The HSS 1224 may comprise a database for network users, including subscription-related information to support the network entities' handling of communication sessions. The EPC 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc. An S6a reference point between the HSS 1224 and the MMEs 1221 may enable transfer of subscription and authentication data for authenticating/authorizing user access to the EPC 1220 between HSS 1224 and the MMEs 1221.

The S-GW 1222 may terminate the S1 interface 1113 ("S1-U" in FIG. 12) toward the RAN 1210, and routes data packets between the RAN 1210 and the EPC 1220. In addition, the S-GW 1222 may be a local mobility anchor point for inter-RAN node handovers and also may provide an anchor for inter-3GPP mobility. Other responsibilities may include lawful intercept, charging, and some policy enforcement. The S11 reference point between the S-GW 1222 and the MMEs 1221 may provide a control plane between the MMEs 1221 and the S-GW 1222. The S-GW 1222 may be coupled with the P-GW 1223 via an S5 reference point.

The P-GW 1223 may terminate a SGi interface toward a PDN 1230. The P-GW 1223 may route data packets between the EPC 1220 and external networks such as a network including the application server 1130 (alternatively referred to as an "AF") via an IP interface 1125 (see e.g., FIG. 11). In embodiments, the P-GW 1223 may be communicatively coupled to an application server (application server 1130 of FIG. 11 or PDN 1230 in FIG. 12) via an IP communications interface 1125 (see, e.g., FIG. 11). The S5 reference point between the P-GW 1223 and the S-GW 1222 may provide user plane tunneling and tunnel management between the P-GW 1223 and the S-GW 1222. The S5 reference point may also be used for S-GW 1222 relocation due to UE 1201 mobility and if the S-GW 1222 needs to connect to a non-collocated P-GW 1223 for the required PDN connectivity. The P-GW 1223 may further include a node for policy enforcement and charging data collection (e.g., PCEF (not shown)). Additionally, the SGi reference point between the P-GW 1223 and the packet data network (PDN) 1230 may be an operator external public, a private PDN, or an intra operator packet data network, for example, for provision of IMS services. The P-GW 1223 may be coupled with a PCRF 1226 via a Gx reference point.

PCRF 1226 is the policy and charging control element of the EPC 1220. In a non-roaming scenario, there may be a single PCRF 1226 in the Home Public Land Mobile Network (HPLMN) associated with a UE 1201's Internet Protocol Connectivity Access Network (IP-CAN) session. In a roaming scenario with local breakout of traffic, there may be two PCRFs associated with a UE 1201's IP-CAN session, a Home PCRF (H-PCRF) within an HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate QoS and charging parameters. The PCRF 1226 may provision this rule into a PCEF (not shown) with the appropriate TFT and QCI, which commences the QoS and charging as specified by the application server 1230. The Gx reference point between the PCRF 1226 and the P-GW 1223 may allow for the transfer of QoS policy and charging rules from the PCRF 1226 to PCEF in the P-GW 1223. An Rx reference point may reside between the PDN 1230 (or "AF 1230") and the PCRF 1226.

Figure 13:
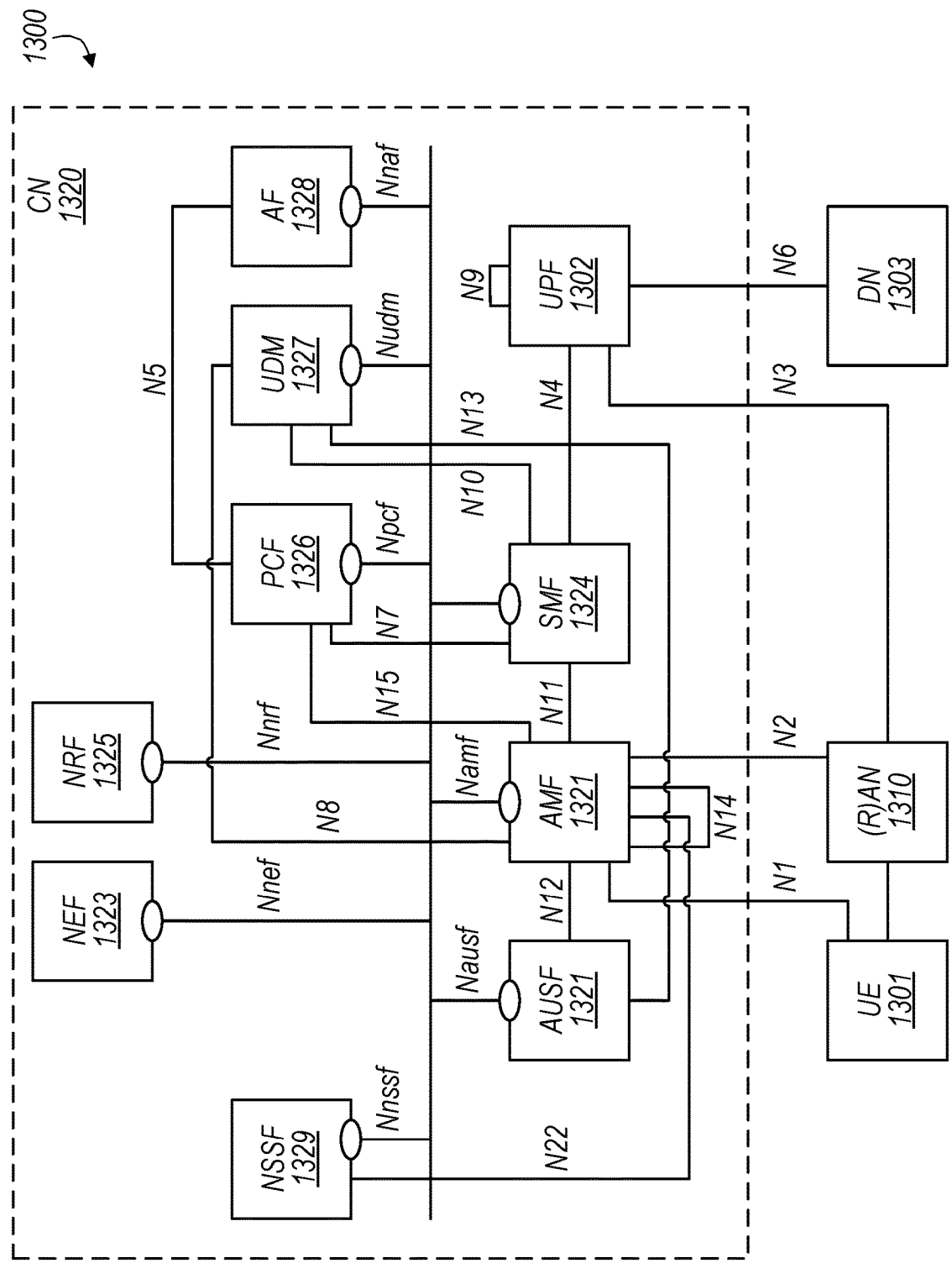
FIG. 13 illustrates an example architecture of a system including a second cellular core network, according to some embodiments.

FIG. 13 illustrates an architecture of a system 1300 including a second CN 1320 in accordance with various embodiments. The system 1300 is shown to include a UE 1301, which may be the same or similar to the UEs 1101 and UE 1201 discussed previously; a (R)AN 1310, which may be the same or similar to the RAN 1110 and RAN 1210 discussed previously, and which may include RAN nodes 1111 discussed previously; and a DN 1303, which may be, for example, operator services, Internet access or 3rd party services; and a 5GC 1320. The 5GC 1320 may include an AUSF 1322; an AMF 1321; a SMF 1324; a NEF 1323; a PCF 1326; a NRF 1325; a UDM 1327; an AF 1328; a UPF 1302; and a NSSF 1329.

The UPF 1302 may act as an anchor point for intra-RAT and inter-RAT mobility, an external PDU session point of interconnect to DN 1303, and a branching point to support multi-homed PDU session. The UPF 1302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 1302 may include an uplink classifier to support routing traffic flows to a data network. The DN 1303 may represent various network operator services, Internet access, or third party services. DN 1303 may include, or be similar to, application server 1130 discussed previously. The UPF 1302 may interact with the SMF 1324 via an N4 reference point between the SMF 1324 and the UPF 1302.

The AUSF 1322 may store data for authentication of UE 1301 and handle authentication-related functionality. The AUSF 1322 may facilitate a common authentication framework for various access types. The AUSF 1322 may communicate with the AMF 1321 via an N12 reference point between the AMF 1321 and the AUSF 1322; and may communicate with the UDM 1327 via an N13 reference point between the UDM 1327 and the AUSF 1322. Additionally, the AUSF 1322 may exhibit an Nausf service-based interface.

The AMF 1321 may be responsible for registration management (e.g., for registering UE 1301, etc.), connection management, reachability management, mobility management, and lawful interception of AMF-related events, and access authentication and authorization. The AMF 1321 may be a termination point for the N11 reference point between the AMF 1321 and the SMF 1324. The AMF 1321 may provide transport for SM messages between the UE 1301 and the SMF 1324, and act as a transparent proxy for routing SM messages. AMF 1321 may also provide transport for SMS messages between UE 1301 and an SMSF (not shown by FIG. 13). AMF 1321 may act as SEAF, which may include interaction with the AUSF 1322 and the UE 1301, receipt of an intermediate key that was established as a result of the UE 1301 authentication process. Where USIM based authentication is used, the AMF 1321 may retrieve the security material from the AUSF 1322. AMF 1321 may also include a SCM function, which receives a key from the SEA that it uses to derive access-network specific keys. Furthermore, AMF 1321 may be a termination point of a RAN CP interface, which may include or be an N2 reference point between the (R)AN 1310 and the AMF 1321; and the AMF 1321 may be a termination point of NAS (N1) signalling, and perform NAS ciphering and integrity protection.

AMF 1321 may also support NAS signalling with a UE 1301 over an N3 IWF interface. The N3IWF may be used to provide access to untrusted entities. N3 IWF may be a termination point for the N2 interface between the (R)AN 1310 and the AMF 1321 for the control plane, and may be a termination point for the N3 reference point between the (R)AN 1310 and the UPF 1302 for the user plane. As such, the AMF 1321 may handle N2 signalling from the SMF 1324 and the AMF 1321 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 1301 and AMF 1321 via an N1 reference point between the UE 1301 and the AMF 1321, and relay uplink and downlink user-plane packets between the UE 1301 and UPF 1302. The N3IWF also provides mechanisms for IPsec tunnel establishment with the UE 1301. The AMF 1321 may exhibit an Namf service-based interface, and may be a termination point for an N14 reference point between two AMFs 1321 and an N17 reference point between the AMF 1321 and a 5G-EIR (not shown by FIG. 13).

The UE 1301 may need to register with the AMF 1321 in order to receive network services. RM is used to register or deregister the UE 1301 with the network (e.g., AMF 1321), and establish a UE context in the network (e.g., AMF 1321). The UE 1301 may operate in an RM-REGISTERED state or an RM-DEREGISTERED state. In the RM DEREGISTERED state, the UE 1301 is not registered with the network, and the UE context in AMF 1321 holds no valid location or routing information for the UE 1301 so the UE 1301 is not reachable by the AMF 1321. In the RM REGISTERED state, the UE 1301 is registered with the network, and the UE context in AMF 1321 may hold a valid location or routing information for the UE 1301 so the UE 1301 is reachable by the AMF 1321. In the RM-REGISTERED state, the UE 1301 may perform mobility Registration Update procedures, perform periodic Registration Update procedures triggered by expiration of the periodic update timer (e.g., to notify the network that the UE 1301 is still active), and perform a Registration Update procedure to update UE capability information or to re-negotiate protocol parameters with the network, among others.

The AMF 1321 may store one or more RM contexts for the UE 1301, where each RM context is associated with a specific access to the network. The RM context may be a data structure, database object, etc. that indicates or stores, inter alia, a registration state per access type and the periodic update timer. The AMF 1321 may also store a 5GC MM context that may be the same or similar to the (E)MM context discussed previously. In various embodiments, the AMF 1321 may store a CE mode B Restriction parameter of the UE 1301 in an associated MM context or RM context. The AMF 1321 may also derive the value, when needed, from the UE's usage setting parameter already stored in the UE context (and/or MM/RM context).

CM may be used to establish and release a signaling connection between the UE 1301 and the AMF 1321 over the N1 interface. The signaling connection is used to enable NAS signaling exchange between the UE 1301 and the CN 1320, and comprises both the signaling connection between the UE and the AN (e.g., RRC connection or UE-N3IWF connection for non-3GPP access) and the N2 connection for the UE 1301 between the AN (e.g., RAN 1310) and the AMF 1321. The UE 1301 may operate in one of two CM states, CM-IDLE mode or CM-CONNECTED mode. When the UE 1301 is operating in the CM-IDLE state/mode, the UE 1301 may have no NAS signaling connection established with the AMF 1321 over the N1 interface, and there may be (R)AN 1310 signaling connection (e.g., N2 and/or N3 connections) for the UE 1301. When the UE 1301 is operating in the CM-CONNECTED state/mode, the UE 1301 may have an established NAS signaling connection with the AMF 1321 over the N1 interface, and there may be a (R)AN 1310 signaling connection (e.g., N2 and/or N3 connections) for the UE 1301. Establishment of an N2 connection between the (R)AN 1310 and the AMF 1321 may cause the UE 1301 to transition from CM-IDLE mode to CM-CONNECTED mode, and the UE 1301 may transition from the CM-CONNECTED mode to the CM-IDLE mode when N2 signaling between the (R)AN 1310 and the AMF 1321 is released.

The SMF 1324 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 1301 and a data network (DN) 1303 identified by a Data Network Name (DNN). PDU sessions may be established upon UE 1301 request, modified upon UE 1301 and 5GC 1320 request, and released upon UE 1301 and 5GC 1320 request using NAS SM signaling exchanged over the N1 reference point between the UE 1301 and the SMF 1324. Upon request from an application server, the 5GC 1320 may trigger a specific application in the UE 1301. In response to receipt of the trigger message, the UE 1301 may pass the trigger message (or relevant parts/information of the trigger message) to one or more identified applications in the UE 1301. The identified application(s) in the UE 1301 may establish a PDU session to a specific DNN. The SMF 1324 may check whether the UE 1301 requests are compliant with user subscription information associated with the UE 1301. In this regard, the SMF 1324 may retrieve and/or request to receive update notifications on SMF 1324 level subscription data from the UDM 1327.

The SMF 1324 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 1324 may be included in the system 1300, which may be between another SMF 1324 in a visited network and the SMF 1324 in the home network in roaming scenarios. Additionally, the SMF 1324 may exhibit the Nsmf service-based interface.

The NEF 1323 may provide means for securely exposing the services and capabilities provided by 3GPP network functions for third party, internal exposure/re-exposure, Application Functions (e.g., AF 1328), edge computing or fog computing systems, etc. In such embodiments, the NEF 1323 may authenticate, authorize, and/or throttle the AFs. NEF 1323 may also translate information exchanged with the AF 1328 and information exchanged with internal network functions. For example, the NEF 1323 may translate between an AF-Service-Identifier and an internal 5GC information. NEF 1323 may also receive information from other network functions (NFs) based on exposed capabilities of other network functions. This information may be stored at the NEF 1323 as structured data, or at a data storage NF using standardized interfaces. The stored information can then be re-exposed by the NEF 1323 to other NFs and AFs, and/or used for other purposes such as analytics. Additionally, the NEF 1323 may exhibit an Nnef service-based interface.

The NRF 1325 may support service discovery functions, receive NF discovery requests from NF instances, and provide the information of the discovered NF instances to the NF instances. NRF 1325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1325 may exhibit the Nnrf service-based interface.

The PCF 1326 may provide policy rules to control plane function(s) to enforce them, and may also support unified policy framework to govern network behaviour. The PCF 1326 may also implement an FE to access subscription information relevant for policy decisions in a UDR of the UDM 1327. The PCF 1326 may communicate with the AMF 1321 via an N15 reference point between the PCF 1326 and the AMF 1321, which may include a PCF 1326 in a visited network and the AMF 1321 in case of roaming scenarios. The PCF 1326 may communicate with the AF 1328 via an N5 reference point between the PCF 1326 and the AF 1328; and with the SMF 1324 via an N7 reference point between the PCF 1326 and the SMF 1324. The system 1300 and/or CN 1320 may also include an N24 reference point between the PCF 1326 (in the home network) and a PCF 1326 in a visited network. Additionally, the PCF 1326 may exhibit an Npcf service-based interface.

The UDM 1327 may handle subscription-related information to support the network entities' handling of communication sessions, and may store subscription data of UE 1301. For example, subscription data may be communicated between the UDM 1327 and the AMF 1321 via an N8 reference point between the UDM 1327 and the AMF. The UDM 1327 may include two parts, an application FE and a UDR (the FE and UDR are not shown by FIG. 13). The UDR may store subscription data and policy data for the UDM 1327 and the PCF 1326, and/or structured data for exposure and application data (including PFDs for application detection, application request information for multiple UEs 1301) for the NEF 1323. The Nudr service-based interface may be exhibited by the UDR to allow the UDM 1327, PCF 1326, and NEF 1323 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 1324 via an N10 reference point between the UDM 1327 and the SMF 1324. UDM 1327 may also support SMS management, wherein an SMS-FE implements the similar application logic as discussed previously. Additionally, the UDM 1327 may exhibit the Nudm service-based interface.

The AF 1328 may provide application influence on traffic routing, provide access to the NCE, and interact with the policy framework for policy control. The NCE may be a mechanism that allows the 5GC 1320 and AF 1328 to provide information to each other via NEF 1323, which may be used for edge computing implementations. In such implementations, the network operator and third party services may be hosted close to the UE 1301 access point of attachment to achieve an efficient service delivery through the reduced end-to-end latency and load on the transport network. For edge computing implementations, the 5GC may select a UPF 1302 close to the UE 1301 and execute traffic steering from the UPF 1302 to DN 1303 via the N6 interface. This may be based on the UE subscription data, UE location, and information provided by the AF 1328. In this way, the AF 1328 may influence UPF (re)selection and traffic routing. Based on operator deployment, when AF 1328 is considered to be a trusted entity, the network operator may permit AF 1328 to interact directly with relevant NFs. Additionally, the AF 1328 may exhibit an Naf service-based interface.

The NSSF 1329 may select a set of network slice instances serving the UE 1301. The NSSF 1329 may also determine allowed NSSAI and the mapping to the subscribed S-NSSAIs, if needed. The NSSF 1329 may also determine the AMF set to be used to serve the UE 1301, or a list of candidate AMF(s) 1321 based on a suitable configuration and possibly by querying the NRF 1325. The selection of a set of network slice instances for the UE 1301 may be triggered by the AMF 1321 with which the UE 1301 is registered by interacting with the NSSF 1329, which may lead to a change of AMF 1321. The NSSF 1329 may interact with the AMF 1321 via an N22 reference point between AMF 1321 and NSSF 1329; and may communicate with another NSSF 1329 in a visited network via an N31 reference point (not shown by FIG. 13). Additionally, the NSSF 1329 may exhibit an Nnssf service-based interface.

As discussed previously, the CN 1320 may include an SMSF, which may be responsible for SMS subscription checking and verification, and relaying SM messages to/from the UE 1301 to/from other entities, such as an SMS-GMSC/IWMSC/SMS-router. The SMS may also interact with AMF 1321 and UDM 1327 for a notification procedure that the UE 1301 is available for SMS transfer (e.g., set a UE not reachable flag, and notifying UDM 1327 when UE 1301 is available for SMS).

The CN 1320 may also include other elements that are not shown by FIG. 13, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 13). Individual NFs may share a UDSF for storing their respective unstructured data or individual NFs may each have their own UDSF located at or near the individual NFs. Additionally, the UDSF may exhibit an Nudsf service-based interface (not shown by FIG. 13). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 13 for clarity. In one example, the CN 1320 may include an Nx interface, which is an inter-CN interface between the MME (e.g., MME 1221) and the AMF 1321 in order to enable interworking between CN 1320 and CN 1220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 14:
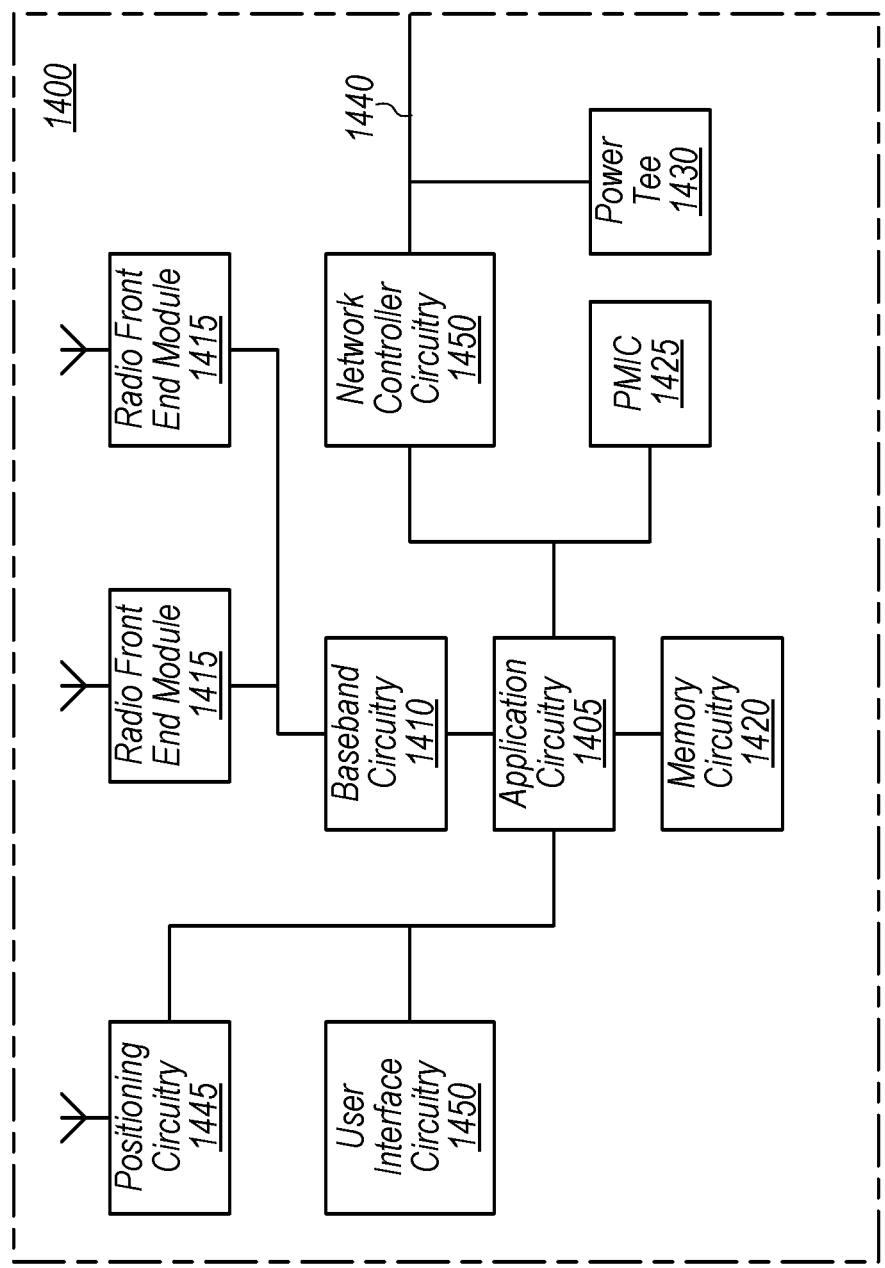
FIG. 14 illustrates an example of infrastructure equipment, according to some embodiments.

FIG. 14 illustrates an example of infrastructure equipment 1400 in accordance with various embodiments. The infrastructure equipment 1400 (or "system 1400") may be implemented as a base station, radio head, RAN node such as the RAN nodes 1111 and/or AP 1106 shown and described previously, application server(s) 1130, and/or any other element/device discussed herein. In other examples, the system 1400 could be implemented in or by a UE.

The system 1400 includes application circuitry 1405, baseband circuitry 1410, one or more radio front end modules (RFEMs) 1415, memory circuitry 1420, power management integrated circuitry (PMIC) 1425, power tee circuitry 1430, network controller circuitry 1435, network interface connector 1440, satellite positioning circuitry 1445, and user interface 1450. In some embodiments, the device 1400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1405 may be coupled with or may include memory/storage elements and may be configured to execute instructions stored in the memory/storage to enable various applications or operating systems to run on the system 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1405 may comprise, or may be, a special-purpose processor/controller to operate according to the various embodiments herein. As examples, the processor(s) of application circuitry 1405 may include one or more Apple® processor(s), such as A5-A9 processor(s); Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium(™), Inc.; a MIPS-based design from MIPS Technologies, Inc. such as MIPS Warrior P-class processors; and/or the like. In some embodiments, the system 1400 may not utilize application circuitry 1405, and instead may include a special-purpose processor/controller to process IP data received from an EPC or 5GC, for example.

In some implementations, the application circuitry 1405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1405 may comprise logic blocks or logic fabric, and other interconnected resources that may be programmed to perform various functions, such as the procedures, methods, functions, etc. of the various embodiments discussed herein. In such embodiments, the circuitry of application circuitry 1405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1410 are discussed infra with regard to FIG. 16.

User interface circuitry 1450 may include one or more user interfaces designed to enable user interaction with the system 1400 or peripheral component interfaces designed to enable peripheral component interaction with the system 1400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEM5) 1415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1611 of FIG. 16 infra), and the RFEM may be connected to multiple antennas. In alternative implementations, both mmWave and sub-mmWave radio functions may be implemented in the same physical RFEM 1415, which incorporates both mmWave antennas and sub-mmWave.

The memory circuitry 1420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1420 may be implemented as one or more of solder down packaged integrated circuits, socketed memory modules and plug-in memory cards.

The PMIC 1425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1430 may provide for electrical power drawn from a network cable to provide both power supply and data connectivity to the infrastructure equipment 1400 using a single cable.

The network controller circuitry 1435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1400 via network interface connector 1440 using a physical connection, which may be electrical (commonly referred to as a "copper interconnect"), optical, or wireless. The network controller circuitry 1435 may include one or more dedicated processors and/or FPGAs to communicate using one or more of the aforementioned protocols. In some implementations, the network controller circuitry 1435 may include multiple controllers to provide connectivity to other networks using the same or different protocols.

The positioning circuitry 1445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1445 may include a Micro-Technology for Positioning, Navigation, and Timing (Micro-PNT) IC that uses a master timing clock to perform position tracking/estimation without GNSS assistance. The positioning circuitry 1445 may also be part of, or interact with, the baseband circuitry 1410 and/or RFEMs 1415 to communicate with the nodes and components of the positioning network. The positioning circuitry 1445 may also provide position data and/or time data to the application circuitry 1405, which may use the data to synchronize operations with various infrastructure (e.g., RAN nodes 1111, etc.), or the like.

The components shown by FIG. 14 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 15:
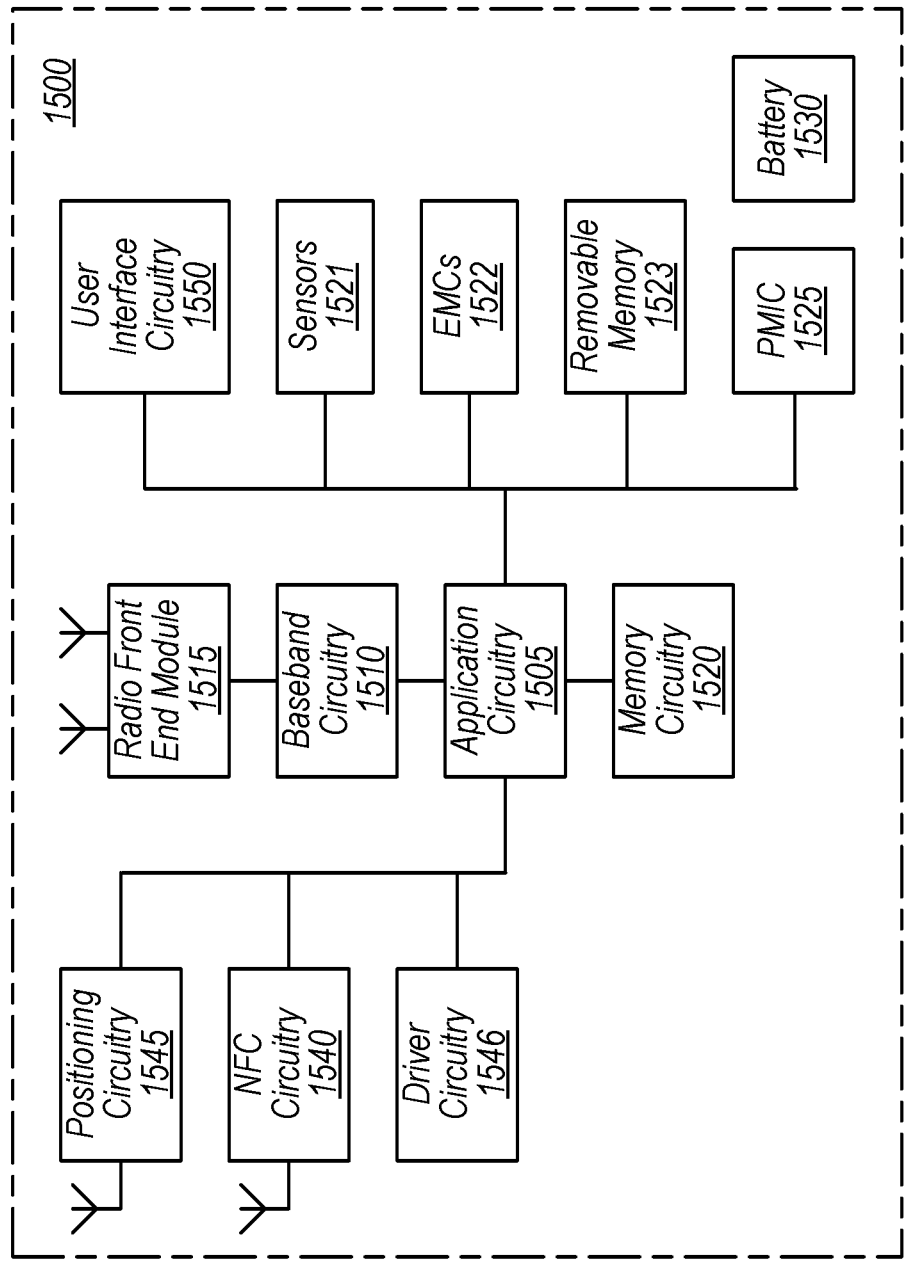
FIG. 15 illustrates an example of a platform or device, according to some embodiments.

FIG. 15 illustrates an example of a platform 1500 (or "device 1500") in accordance with various embodiments. In embodiments, the computer platform 1500 may be suitable for use as UEs 1101, 1201, 1301, application servers 1130, and/or any other element/device discussed herein. The platform 1500 may include any combinations of the components shown in the example. The components of platform 1500 may be implemented as integrated circuits (ICs), portions thereof, discrete electronic devices, or other modules, logic, hardware, software, firmware, or a combination thereof adapted in the computer platform 1500, or as components otherwise incorporated within a chassis of a larger system. The block diagram of FIG. 15 is intended to show a high level view of components of the computer platform 1500. However, some of the components shown may be omitted, additional components may be present, and different arrangement of the components shown may occur in other implementations.

Application circuitry 1505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1505 may be coupled with or may include memory/storage elements and may be configured to execute instructions stored in the memory/storage to enable various applications or operating systems to run on the system 1500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1405 may comprise, or may be, a special-purpose processor/controller to operate according to the various embodiments herein.

As examples, the processor(s) of application circuitry 1505 may include one or more A series processor(s) from Apple® Inc., such as A5-A9 processor(s). The processors of the application circuitry 1505 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1505 may be a part of a system on a chip (SoC) in which the application circuitry 1505 and other components are formed into a single integrated circuit, or a single package, such as the Edison™ or Galileo™ SoC boards from Intel® Corporation.

Additionally or alternatively, application circuitry 1505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1505 may comprise logic blocks or logic fabric, and other interconnected resources that may be programmed to perform various functions, such as the procedures, methods, functions, etc. of the various embodiments discussed herein. In such embodiments, the circuitry of application circuitry 1505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1510 are discussed infra with regard to FIG. 16.

The RFEMs 1515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1611 of FIG. 16 infra), and the RFEM may be connected to multiple antennas. In alternative implementations, both mmWave and sub-mmWave radio functions may be implemented in the same physical RFEM 1515, which incorporates both mmWave antennas and sub-mmWave.

The memory circuitry 1520 may include any number and type of memory devices used to provide for a given amount of system memory. As examples, the memory circuitry 1520 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1520 may be developed in accordance with a Joint Electron Devices Engineering Council (JEDEC) low power double data rate (LPDDR)-based design, such as LPDDR2, LPDDR3, LPDDR4, or the like. Memory circuitry 1520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1520 may be on-die memory or registers associated with the application circuitry 1505. To provide for persistent storage of information such as data, applications, operating systems and so forth, memory circuitry 1520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1500 may incorporate the three-dimensional (3D) cross-point (XPOINT) memories from Intel® and Micron®.

Removable memory circuitry 1523 may include devices, circuitry, enclosures/housings, ports or receptacles, etc. used to couple portable data storage devices with the platform 1500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1500 may also include interface circuitry (not shown) that is used to connect external devices with the platform 1500. The external devices connected to the platform 1500 via the interface circuitry include sensor circuitry 1521 and electro-mechanical components (EMCs) 1522, as well as removable memory devices coupled to removable memory circuitry 1523.

The sensor circuitry 1521 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1522 include devices, modules, or subsystems whose purpose is to enable platform 1500 to change its state, position, and/or orientation, or move or control a mechanism or (sub)system. Additionally, EMCs 1522 may be configured to generate and send messages/signalling to other components of the platform 1500 to indicate a current state of the EMCs 1522. Examples of the EMCs 1522 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1500 is configured to operate one or more EMCs 1522 based on one or more captured events and/or instructions or control signals received from a service provider and/or various clients.

In some implementations, the interface circuitry may connect the platform 1500 with positioning circuitry 1545. The positioning circuitry 1545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1545 may include a Micro-PNT IC that uses a master timing clock to perform position tracking/estimation without GNSS assistance. The positioning circuitry 1545 may also be part of, or interact with, the baseband circuitry 1410 and/or RFEMs 1515 to communicate with the nodes and components of the positioning network. The positioning circuitry 1545 may also provide position data and/or time data to the application circuitry 1505, which may use the data to synchronize operations with various infrastructure (e.g., radio base stations), for turn-by-turn navigation applications, or the like In some implementations, the interface circuitry may connect the platform 1500 with Near-Field Communication (NFC) circuitry 1540. NFC circuitry 1540 is configured to provide contactless, short-range communications based on radio frequency identification (RFID) standards, wherein magnetic field induction is used to enable communication between NFC circuitry 1540 and NFC-enabled devices external to the platform 1500 (e.g., an "NFC touchpoint"). NFC circuitry 1540 comprises an NFC controller coupled with an antenna element and a processor coupled with the NFC controller. The NFC controller may be a chip/IC providing NFC functionalities to the NFC circuitry 1540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1540, or initiate data transfer between the NFC circuitry 1540 and another active NFC device (e.g., a smartphone or an NFC-enabled POS terminal) that is proximate to the platform 1500.

The driver circuitry 1546 may include software and hardware elements that operate to control particular devices that are embedded in the platform 1500, attached to the platform 1500, or otherwise communicatively coupled with the platform 1500. The driver circuitry 1546 may include individual drivers allowing other components of the platform 1500 to interact with or control various input/output (I/O) devices that may be present within, or connected to, the platform 1500. For example, driver circuitry 1546 may include a display driver to control and allow access to a display device, a touchscreen driver to control and allow access to a touchscreen interface of the platform 1500, sensor drivers to obtain sensor readings of sensor circuitry 1521 and control and allow access to sensor circuitry 1521, EMC drivers to obtain actuator positions of the EMCs 1522 and/or control and allow access to the EMCs 1522, a camera driver to control and allow access to an embedded image capture device, audio drivers to control and allow access to one or more audio devices.

The power management integrated circuitry (PMIC) 1525 (also referred to as "power management circuitry 1525") may manage power provided to various components of the platform 1500. In particular, with respect to the baseband circuitry 1510, the PMIC 1525 may control power-source selection, voltage scaling, battery charging, or DC-to-DC conversion. The PMIC 1525 may often be included when the platform 1500 is capable of being powered by a battery 1530, for example, when the device is included in a UE 1101, 1201, 1301.

In some embodiments, the PMIC 1525 may control, or otherwise be part of, various power saving mechanisms of the platform 1500. For example, if the platform 1500 is in an RRC Connected state, where it is still connected to the RAN node as it expects to receive traffic shortly, then it may enter a state known as Discontinuous Reception Mode (DRX) after a period of inactivity. During this state, the platform 1500 may power down for brief intervals of time and thus save power. If there is no data traffic activity for an extended period of time, then the platform 1500 may transition off to an RRC Idle state, where it disconnects from the network and does not perform operations such as channel quality feedback, handover, etc. The platform 1500 goes into a very low power state and it performs paging where again it periodically wakes up to listen to the network and then powers down again. The platform 1500 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1530 may power the platform 1500, although in some examples the platform 1500 may be mounted deployed in a fixed location, and may have a power supply coupled to an electrical grid. The battery 1530 may be a lithium ion battery, a metal-air battery, such as a zinc-air battery, an aluminum-air battery, a lithium-air battery, and the like. In some implementations, such as in V2X applications, the battery 1530 may be a typical lead-acid automotive battery.

In some implementations, the battery 1530 may be a "smart battery," which includes or is coupled with a Battery Management System (BMS) or battery monitoring integrated circuitry. The BMS may be included in the platform 1500 to track the state of charge (SoCh) of the battery 1530. The BMS may be used to monitor other parameters of the battery 1530 to provide failure predictions, such as the state of health (SoH) and the state of function (SoF) of the battery 1530. The BMS may communicate the information of the battery 1530 to the application circuitry 1505 or other components of the platform 1500. The BMS may also include an analog-to-digital (ADC) convertor that allows the application circuitry 1505 to directly monitor the voltage of the battery 1530 or the current flow from the battery 1530. The battery parameters may be used to determine actions that the platform 1500 may perform, such as transmission frequency, network operation, sensing frequency, and the like.

A power block, or other power supply coupled to an electrical grid may be coupled with the BMS to charge the battery 1530. In some examples, the power block XS30 may be replaced with a wireless power receiver to obtain the power wirelessly, for example, through a loop antenna in the computer platform 1500. In these examples, a wireless battery charging circuit may be included in the BMS. The specific charging circuits chosen may depend on the size of the battery 1530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1550 includes various input/output (I/O) devices present within, or connected to, the platform 1500, and includes one or more user interfaces designed to enable user interaction with the platform 1500 and/or peripheral component interfaces designed to enable peripheral component interaction with the platform 1500. The user interface circuitry 1550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1500. The output device circuitry may also include speakers or other audio emitting devices, printer(s), and/or the like. In some embodiments, the sensor circuitry 1521 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 16:
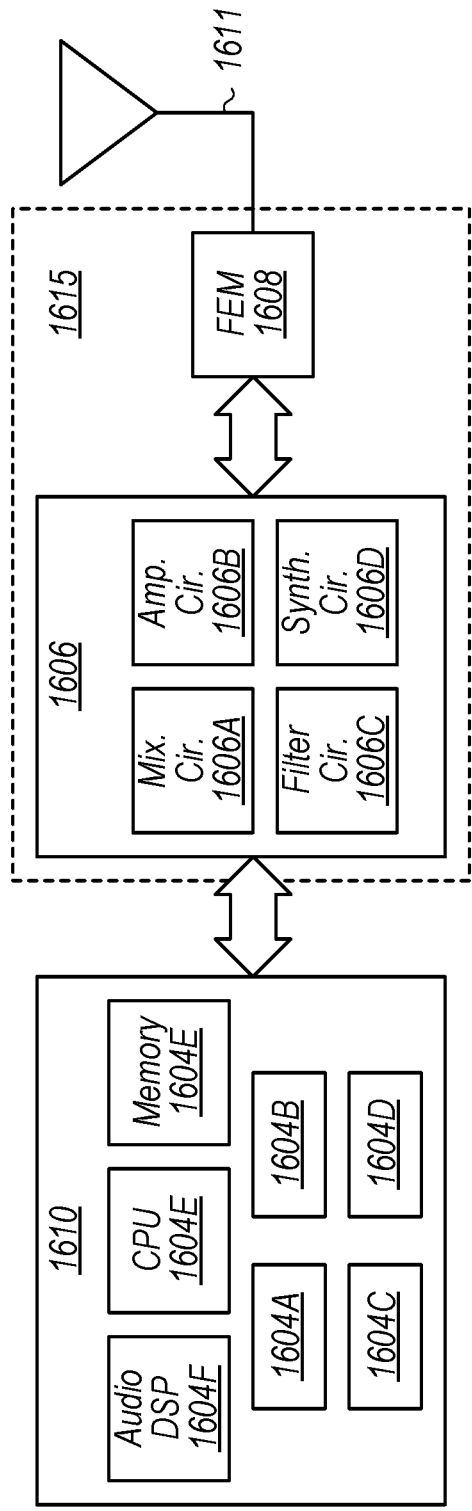
FIG. 16 illustrates example components of baseband circuitry and radio front end modules, according to some embodiments.

FIG. 16 illustrates example components of baseband circuitry 1610 and radio front end modules (RFEM) 1615 in accordance with various embodiments. The baseband circuitry 1610 corresponds to the baseband circuitry 1410 and 1510 of FIGS. 14 and 15, respectively. The RFEM 1615 corresponds to the RFEM 1415 and 1515 of FIGS. 14 and 15, respectively. As shown, the RFEMs 1615 may include Radio Frequency (RF) circuitry 1606, front-end module (FEM) circuitry 1608, antenna array 1611 coupled together at least as shown.

The baseband circuitry 1610 includes circuitry and/or control logic configured to carry out various radio/network protocol and radio control functions that enable communication with one or more radio networks via the RF circuitry 1606. The radio control functions may include, but are not limited to, signal modulation/demodulation, encoding/decoding, radio frequency shifting, etc. In some embodiments, modulation/demodulation circuitry of the baseband circuitry 1610 may include Fast-Fourier Transform (FFT), precoding, or constellation mapping/demapping functionality. In some embodiments, encoding/decoding circuitry of the baseband circuitry 1610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1610 is configured to process baseband signals received from a receive signal path of the RF circuitry 1606 and to generate baseband signals for a transmit signal path of the RF circuitry 1606. The baseband circuitry 1610 is configured to interface with application circuitry 1405/1505 (see FIGS. 14 and 15) for generation and processing of the baseband signals and for controlling operations of the RF circuitry 1606. The baseband circuitry 1610 may handle various radio control functions.

The aforementioned circuitry and/or control logic of the baseband circuitry 1610 may include one or more single or multi-core processors. For example, the one or more processors may include a 3G baseband processor 1604A, a 4G/LTE baseband processor 1604B, a 5G/NR baseband processor 1604C, or some other baseband processor(s) 1604D for other existing generations, generations in development or to be developed in the future (e.g., sixth generation (6G), etc.). In other embodiments, some or all of the functionality of baseband processors 1604A-D may be included in modules stored in the memory 1604G and executed via a Central Processing Unit (CPU) 1604E. In other embodiments, some or all of the functionality of baseband processors 1604A-D may be provided as hardware accelerators (e.g., FPGAs, ASICs, etc.) loaded with the appropriate bit streams or logic blocks stored in respective memory cells. In various embodiments, the memory 1604G may store program code of a real-time OS (RTOS), which when executed by the CPU 1604E (or other baseband processor), is to cause the CPU 1604E (or other baseband processor) to manage resources of the baseband circuitry 1610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1610 includes one or more audio digital signal processor(s) (DSP) 1604F. The audio DSP(s) 1604F include elements for compression/decompression and echo cancellation and may include other suitable processing elements in other embodiments.

In some embodiments, each of the processors 1604A-1604E include respective memory interfaces to send/receive data to/from the memory 1604G. The baseband circuitry 1610 may further include one or more interfaces to communicatively couple to other circuitries/devices, such as an interface to send/receive data to/from memory external to the baseband circuitry 1610; an application circuitry interface to send/receive data to/from the application circuitry 1405/1505 of FIGS. 14-16); an RF circuitry interface to send/receive data to/from RF circuitry 1606 of FIG. 16; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1525.

In alternate embodiments (which may be combined with the above described embodiments), baseband circuitry 1610 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1610 may include protocol processing circuitry with one or more instances of control circuitry (not shown) to provide control functions for the digital baseband circuitry and/or radio frequency circuitry (e.g., the radio front end modules 1615).

Although not shown by FIG. 16, in some embodiments, the baseband circuitry 1610 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1610 and/or RF circuitry 1606 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1610 and/or RF circuitry 1606 are part of a Wi-Fi communication system. In the second example, the protocol processing circuitry would operate Wi-Fi MAC and logical link control (LLC) functions. The protocol processing circuitry may include one or more memory structures (e.g., 1604G) to store program code and data for operating the protocol functions, as well as one or more processing cores to execute the program code and perform various operations using the data. The baseband circuitry 1610 may also support radio communications for more than one wireless protocol.

The various hardware elements of the baseband circuitry 1610 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1610 may be suitably combined in a single chip or chipset, or disposed on a same circuit board. In another example, some or all of the constituent components of the baseband circuitry 1610 and RF circuitry 1606 may be implemented together such as, for example, a system on a chip (SoC) or System-in-Package (SiP). In another example, some or all of the constituent components of the baseband circuitry 1610 may be implemented as a separate SoC that is communicatively coupled with and RF circuitry 1606 (or multiple instances of RF circuitry 1606). In yet another example, some or all of the constituent components of the baseband circuitry 1610 and the application circuitry 1405/1505 may be implemented together as individual SoCs mounted to a same circuit board (e.g., a "multi-chip package").

In some embodiments, the baseband circuitry 1610 may provide for communication compatible with one or more radio technologies. For example, in some embodiments, the baseband circuitry 1610 may support communication with an E-UTRAN or other WMAN, a WLAN, a WPAN. Embodiments in which the baseband circuitry 1610 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path, which may include circuitry to down-convert RF signals received from the FEM circuitry 1608 and provide baseband signals to the baseband circuitry 1610. RF circuitry 1606 may also include a transmit signal path, which may include circuitry to up-convert baseband signals provided by the baseband circuitry 1610 and provide RF output signals to the FEM circuitry 1608 for transmission.

In some embodiments, the receive signal path of the RF circuitry 1606 may include mixer circuitry 1606a, amplifier circuitry 1606b and filter circuitry 1606c. In some embodiments, the transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1610 for further processing. In some embodiments, the output baseband signals may be zero-frequency baseband signals, although this is not a requirement. In some embodiments, mixer circuitry 1606a of the receive signal path may comprise passive mixers, although the scope of the embodiments is not limited in this respect.

In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1610 and may be filtered by filter circuitry 1606c.

In some embodiments, the mixer circuitry 1606a of the receive signal path and the mixer circuitry 1606a of the transmit signal path may include two or more mixers and may be arranged for quadrature downconversion and upconversion, respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a of the transmit signal path may be arranged for direct downconversion and direct upconversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1610 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider.

The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer.

In some embodiments, frequency input may be provided by a voltage controlled oscillator (VCO), although that is not a requirement. Divider control input may be provided by either the baseband circuitry 1610 or the application circuitry 1405/1505 depending on the desired output frequency. In some embodiments, a divider control input (e.g., N) may be determined from a look-up table based on a channel indicated by the application circuitry 1405/1505.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path, which may include circuitry configured to operate on RF signals received from antenna array 1611, amplify the received signals and provide the amplified versions of the received signals to the RF circuitry 1606 for further processing. FEM circuitry 1608 may also include a transmit signal path, which may include circuitry configured to amplify signals for transmission provided by the RF circuitry 1606 for transmission by one or more of antenna elements of antenna array 1611. In various embodiments, the amplification through the transmit or receive signal paths may be done solely in the RF circuitry 1606, solely in the FEM circuitry 1608, or in both the RF circuitry 1606 and the FEM circuitry 1608.

In some embodiments, the FEM circuitry 1608 may include a TX/RX switch to switch between transmit mode and receive mode operation. The FEM circuitry 1608 may include a receive signal path and a transmit signal path. The receive signal path of the FEM circuitry 1608 may include an LNA to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission by one or more antenna elements of the antenna array 1611.

The antenna array 1611 comprises one or more antenna elements, each of which is configured convert electrical signals into radio waves to travel through the air and to convert received radio waves into electrical signals. For example, digital baseband signals provided by the baseband circuitry 1610 is converted into analog RF signals (e.g., modulated waveform) that will be amplified and transmitted via the antenna elements of the antenna array 1611 including one or more antenna elements (not shown). The antenna elements may be omnidirectional, direction, or a combination thereof. The antenna elements may be formed in a multitude of arranges as are known and/or discussed herein. The antenna array 1611 may comprise microstrip antennas or printed antennas that are fabricated on the surface of one or more printed circuit boards. The antenna array 1611 may be formed in as a patch of metal foil (e.g., a patch antenna) in a variety of shapes, and may be coupled with the RF circuitry 1606 and/or FEM circuitry 1608 using metal transmission lines or the like.

Processors of the application circuitry 1405/1505 and processors of the baseband circuitry 1610 may be used to execute elements of one or more instances of a protocol stack. For example, processors of the baseband circuitry 1610, alone or in combination, may be used execute Layer 3, Layer 2, or Layer 1 functionality, while processors of the application circuitry 1405/1505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 17:
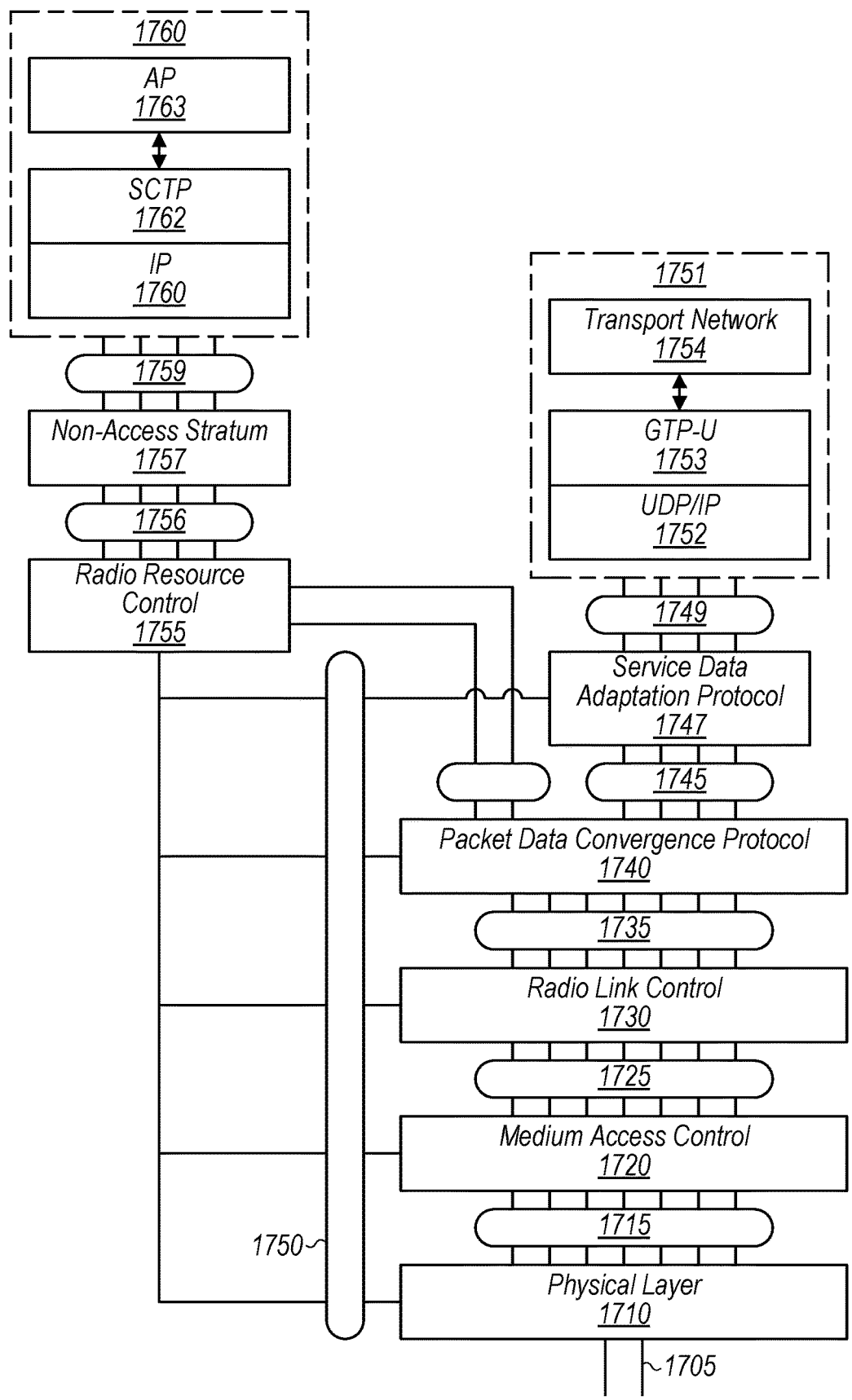
FIG. 17 illustrates various protocol functions that may be implemented in a wireless communication device, according to some embodiments.

FIG. 17 illustrates various protocol functions that may be implemented in a wireless communication device according to various embodiments. In particular, FIG. 17 includes an arrangement 1700 showing interconnections between various protocol layers/entities. The following description of FIG. 17 is provided for various protocol layers/entities that operate in conjunction with the 5G/NR system standards and LTE system standards, but some or all of the aspects of FIG. 17 may be applicable to other wireless communication network systems as well.

The protocol layers of arrangement 1700 may include one or more of PHY 1710, MAC 1720, RLC 1730, PDCP 1740, SDAP 1747, RRC 1755, and NAS layer 1757, in addition to other higher layer functions not illustrated. The protocol layers may include one or more service access points (e.g., items 1759, 1756, 1750, 1749, 1745, 1735, 1725, and 1715 in FIG. 17) that may provide communication between two or more protocol layers.

The PHY 1710 may transmit and receive physical layer signals 1705 that may be received from or transmitted to one or more other communication devices. The physical layer signals 1705 may comprise one or more physical channels, such as those discussed herein. The PHY 1710 may further perform link adaptation or adaptive modulation and coding (AMC), power control, cell search (e.g., for initial synchronization and handover purposes), and other measurements used by higher layers, such as the RRC 1755. The PHY 1710 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1710 may process requests from and provide indications to an instance of MAC 1720 via one or more PHY-SAP 1715. According to some embodiments, requests and indications communicated via PHY-SAP 1715 may comprise one or more transport channels.

Instance(s) of MAC 1720 may process requests from, and provide indications to, an instance of RLC 1730 via one or more MAC-SAPs 1725. These requests and indications communicated via the MAC-SAP 1725 may comprise one or more logical channels. The MAC 1720 may perform mapping between the logical channels and transport channels, multiplexing of MAC SDUs from one or more logical channels onto TBs to be delivered to PHY 1710 via the transport channels, de-multiplexing MAC SDUs to one or more logical channels from TBs delivered from the PHY 1710 via transport channels, multiplexing MAC SDUs onto TBs, scheduling information reporting, error correction through HARQ, and logical channel prioritization.

Instance(s) of RLC 1730 may process requests from and provide indications to an instance of PDCP 1740 via one or more radio link control service access points (RLC-SAP) 1735. These requests and indications communicated via RLC-SAP 1735 may comprise one or more RLC channels. The RLC 1730 may operate in a plurality of modes of operation, including: Transparent Mode (TM), Unacknowledged Mode (UM), and Acknowledged Mode (AM). The RLC 1730 may execute transfer of upper layer protocol data units (PDUs), error correction through automatic repeat request (ARQ) for AM data transfers, and concatenation, segmentation and reassembly of RLC SDUs for UM and AM data transfers. The RLC 1730 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1740 may process requests from and provide indications to instance(s) of RRC 1755 and/or instance(s) of SDAP 1747 via one or more packet data convergence protocol service access points (PDCP-SAP) 1745. These requests and indications communicated via PDCP-SAP 1745 may comprise one or more radio bearers. The PDCP 1740 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1747 may process requests from and provide indications to one or more higher layer protocol entities via one or more SDAP-SAP 1749. These requests and indications communicated via SDAP-SAP 1749 may comprise one or more QoS flows. The SDAP 1747 may map QoS flows to DRBs, and vice versa, and may also mark QFIs in DL and UL packets. A single SDAP entity 1747 may be configured for an individual PDU session. In the UL direction, the NG-RAN 1110 may control the mapping of QoS Flows to DRB(s) in two different ways, reflective mapping or explicit mapping. For reflective mapping, the SDAP 1747 of a UE 1101 may monitor the QFIs of the DL packets for each DRB, and may apply the same mapping for packets flowing in the UL direction. For a DRB, the SDAP 1747 of the UE 1101 may map the UL packets belonging to the QoS flows(s) corresponding to the QoS flow ID(s) and PDU session observed in the DL packets for that DRB. To enable reflective mapping, the NG-RAN 1310 may mark DL packets over the Uu interface with a QoS flow ID. The explicit mapping may involve the RRC 1755 configuring the SDAP 1747 with an explicit QoS flow to DRB mapping rule, which may be stored and followed by the SDAP 1747. In embodiments, the SDAP 1747 may only be used in NR implementations and may not be used in LTE implementations.

The RRC 1755 may configure, via one or more management service access points (M-SAP), aspects of one or more protocol layers, which may include one or more instances of PHY 1710, MAC 1720, RLC 1730, PDCP 1740 and SDAP 1747. In embodiments, an instance of RRC 1755 may process requests from and provide indications to one or more NAS entities 1757 via one or more RRC-SAPs 1756. The main services and functions of the RRC 1755 may include broadcast of system information (e.g., included in MIBs or SIBs related to the NAS), broadcast of system information related to the access stratum (AS), paging, establishment, maintenance and release of an RRC connection between the UE 1101 and RAN 1110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1757 may form the highest stratum of the control plane between the UE 1101 and the AMF 1321. The NAS 1757 may support the mobility of the UEs 1101 and the session management procedures to establish and maintain IP connectivity between the UE 1101 and a P-GW in LTE systems.

According to various embodiments, one or more protocol entities of arrangement 1700 may be implemented in UEs 1101, RAN nodes 1111, AMF 1321 in NR implementations or MME 1221 in LTE implementations, UPF 1302 in NR implementations or S-GW 1222 and P-GW 1223 in LTE implementations, or the like to be used for control plane or user plane communications protocol stack between the aforementioned devices. In such embodiments, one or more protocol entities that may be implemented in one or more of UE 1101, gNB 1111, AMF 1321, etc. may communicate with a respective peer protocol entity that may be implemented in or on another device using the services of respective lower layer protocol entities to perform such communication. In some embodiments, a gNB-CU of the gNB 1111 may host the RRC 1755, SDAP 1747, and PDCP 1740 of the gNB that controls the operation of one or more gNB-DUs, and the gNB-DUs of the gNB 1111 may each host the RLC 1730, MAC 1720, and PHY 1710 of the gNB 1111.

In a first example, a control plane protocol stack may comprise, in order from highest layer to lowest layer, NAS 1757, RRC 1755, PDCP 1740, RLC 1730, MAC 1720, and PHY 1710. In this example, upper layers 1760 may be built on top of the NAS 1757, which includes an IP layer 1761, an SCTP 1762, and an application layer signaling protocol (AP) 1763.

In NR implementations, the AP 1763 may be an NG application protocol layer (NGAP or NG-AP) 1763 for the NG interface 1113 defined between the NG-RAN node 1111 and the AMF 1321, or the AP 1763 may be an Xn application protocol layer (XnAP or Xn-AP) 1763 for the Xn interface 1112 that is defined between two or more RAN nodes 1111.

The NG-AP 1763 may support the functions of the NG interface 1113 and may comprise Elementary Procedures (EPs). An NG-AP EP may be a unit of interaction between the NG-RAN node 1111 and the AMF 1321. The NG-AP 1763 services may comprise two groups: UE-associated services (e.g., services related to a UE 1101) and non-UE-associated services (e.g., services related to the whole NG interface instance between the NG-RAN node 1111 and AMF 1321). These services may include functions including, but not limited to: a paging function for the sending of paging requests to NG-RAN nodes 1111 involved in a particular paging area; a UE context management function for allowing the AMF 1321 to establish, modify, and/or release a UE context in the AMF 1321 and the NG-RAN node 1111; a mobility function for UEs 1101 in ECM-CONNECTED mode for intra-system HOs to support mobility within NG-RAN and inter-system HOs to support mobility from/to EPS systems; a NAS Signaling Transport function for transporting or rerouting NAS messages between UE 1101 and AMF 1321; a NAS node selection function for determining an association between the AMF 1321 and the UE 1101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 1111 via CN 1120; and/or other like functions.

The XnAP 1763 may support the functions of the Xn interface 1112 and may comprise XnAP basic mobility procedures and XnAP global procedures. The XnAP basic mobility procedures may comprise procedures used to handle UE mobility within the NG RAN 1111 (or E-UTRAN 1210), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 1101, such as Xn interface setup and reset procedures, NG-RAN update procedures, cell activation procedures, and the like.

In LTE implementations, the AP 1763 may be an S1 Application Protocol layer (S1-AP) 1763 for the S1 interface 1113 defined between an E-UTRAN node 1111 and an MME, or the AP 1763 may be an X2 application protocol layer (X2AP or X2-AP) 1763 for the X2 interface 1112 that is defined between two or more E-UTRAN nodes 1111.

The S1 Application Protocol layer (S1-AP) 1763 may support the functions of the S1 interface, and similar to the NG-AP discussed previously, the S1-AP may comprise S1-AP EPs. An S1-AP EP may be a unit of interaction between the E-UTRAN node 1111 and an MME 1221 within an LTE CN 1120. The S1-AP 1763 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1763 may support the functions of the X2 interface 1112 and may comprise X2AP basic mobility procedures and X2AP global procedures. The X2AP basic mobility procedures may comprise procedures used to handle UE mobility within the E-UTRAN 1120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 1101, such as X2 interface setup and reset procedures, load indication procedures, error indication procedures, cell activation procedures, and the like.

The SCTP layer (alternatively referred to as the SCTP/IP layer) 1762 may provide guaranteed delivery of application layer messages (e.g., NGAP or XnAP messages in NR implementations, or S1-AP or X2AP messages in LTE implementations). The SCTP 1762 may ensure reliable delivery of signaling messages between the RAN node 1111 and the AMF 1321/MME 1221 based, in part, on the IP protocol, supported by the IP 1761. The Internet Protocol layer (IP) 1761 may be used to perform packet addressing and routing functionality. In some implementations the IP layer 1761 may use point-to-point transmission to deliver and convey PDUs. In this regard, the RAN node 1111 may comprise L2 and L1 layer communication links (e.g., wired or wireless) with the MME/AMF to exchange information.

In a second example, a user plane protocol stack may comprise, in order from highest layer to lowest layer, SDAP 1747, PDCP 1740, RLC 1730, MAC 1720, and PHY 1710. The user plane protocol stack may be used for communication between the UE 1101, the RAN node 1111, and UPF 1302 in NR implementations or an S-GW 1222 and P-GW 1223 in LTE implementations. In this example, upper layers 1751 may be built on top of the SDAP 1747, and may include a user datagram protocol (UDP) and IP security layer (UDP/IP) 1752, a General Packet Radio Service (GPRS) Tunneling Protocol for the user plane layer (GTP-U) 1753, and a User Plane PDU layer (UP PDU) 1763.

The transport network layer 1754 (also referred to as a "transport layer") may be built on IP transport, and the GTP-U 1753 may be used on top of the UDP/IP layer 1752 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1753 may be used for carrying user data within the GPRS core network and between the radio access network and the core network. The user data transported can be packets in any of IPv4, IPv6, or PPP formats, for example. The UDP/IP 1752 may provide checksums for data integrity, port numbers for addressing different functions at the source and destination, and encryption and authentication on the selected data flows. The RAN node 1111 and the S-GW 1222 may utilize an S1-U interface to exchange user plane data via a protocol stack comprising an L1 layer (e.g., PHY 1710), an L2 layer (e.g., MAC 1720, RLC 1730, PDCP 1740, and/or SDAP 1747), the UDP/IP layer 1752, and the GTP-U 1753. The S-GW 1222 and the P-GW 1223 may utilize an S5/S8a interface to exchange user plane data via a protocol stack comprising an L1 layer, an L2 layer, the UDP/IP layer 1752, and the GTP-U 1753. As discussed previously, NAS protocols may support the mobility of the UE 1101 and the session management procedures to establish and maintain IP connectivity between the UE 1101 and the P-GW 1223.

Moreover, although not shown by FIG. 17, an application layer may be present above the AP 1763 and/or the transport network layer 1754. The application layer may be a layer in which a user of the UE 1101, RAN node 1111, or other network element interacts with software applications being executed, for example, by application circuitry 1405 or application circuitry 1505, respectively. The application layer may also provide one or more interfaces for software applications to interact with communications systems of the UE 1101 or RAN node 1111, such as the baseband circuitry 1610. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 18:
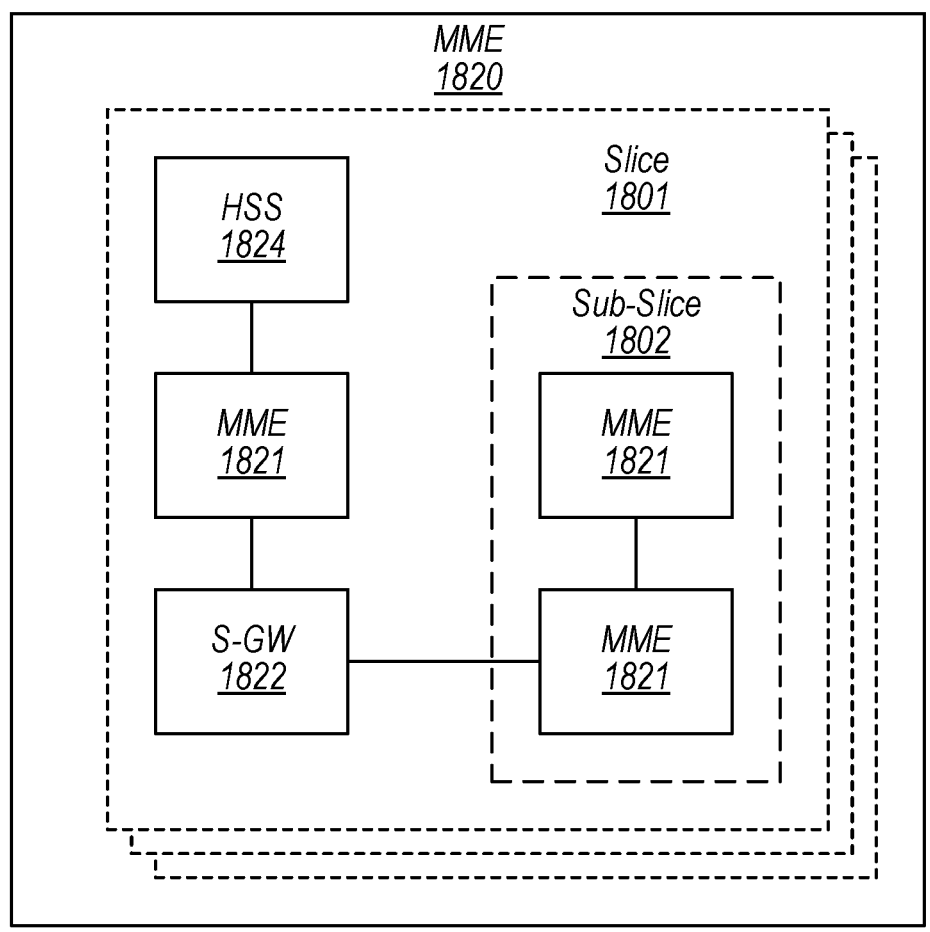
FIG. 18 illustrates components of a core network, according to some embodiments.

FIG. 18 illustrates components of a core network in accordance with various embodiments. The components of the CN 1220 may be implemented in one physical node or separate physical nodes including components to read and execute instructions from a machine-readable or computer-readable medium (e.g., a non-transitory machine-readable storage medium). In embodiments, the components of CN 1320 may be implemented in a same or similar manner as discussed herein with regard to the components of CN 1220. In some embodiments, NFV is utilized to virtualize any or all of the above-described network node functions via executable instructions stored in one or more computer-readable storage mediums (described in further detail below). A logical instantiation of the CN 1220 may be referred to as a network slice 1801, and individual logical instantiations of the CN 1220 may provide specific network capabilities and network characteristics. A logical instantiation of a portion of the CN 1220 may be referred to as a network sub-slice 1802 (e.g., the network sub-slice 1802 is shown to include the P-GW 1223 and the PCRF 1226).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 13), a network slice always comprises a RAN part and a CN part. The support of network slicing relies on the principle that traffic for different slices is handled by different PDU sessions. The network can realize the different network slices by scheduling and also by providing different L1/L2 configurations. The UE 1301 provides assistance information for network slice selection in an appropriate RRC message, if it has been provided by NAS. While the network can support large number of slices, the UE need not support more than 8 slices simultaneously.

A network slice may include the CN 1320 control plane and user plane NFs, NG-RANs 1310 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 1301 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 1321 instance serving an individual UE 1301 may belong to each of the network slice instances serving that UE.

Network Slicing in the NG-RAN 1310 involves RAN slice awareness. RAN slice awareness includes differentiated handling of traffic for different network slices, which have been pre-configured. Slice awareness in the NG-RAN 1310 is introduced at the PDU session level by indicating the S-NSSAI corresponding to a PDU session in all signaling that includes PDU session resource information. How the NG-RAN 1310 supports the slice enabling in terms of NG-RAN functions (e.g., the set of network functions that comprise each slice) is implementation dependent. The NG-RAN 1310 selects the RAN part of the network slice using assistance information provided by the UE 1301 or the 5GC 1320, which unambiguously identifies one or more of the pre-configured network slices in the PLMN. The NG-RAN 1310 also supports resource management and policy enforcement between slices as per SLAs. A single NG-RAN node may support multiple slices, and the NG-RAN 1310 may also apply an appropriate RRM policy for the SLA in place to each supported slice. The NG-RAN 1310 may also support QoS differentiation within a slice.

The NG-RAN 1310 may also use the UE assistance information for the selection of an AMF 1321 during an initial attach, if available. The NG-RAN 1310 uses the assistance information for routing the initial NAS to an AMF 1321. If the NG-RAN 1310 is unable to select an AMF 1321 using the assistance information, or the UE 1301 does not provide any such information, the NG-RAN 1310 sends the NAS signaling to a default AMF 1321, which may be among a pool of AMFs 1321. For subsequent accesses, the UE 1301 provides a temp ID, which is assigned to the UE 1301 by the 5GC 1320, to enable the NG-RAN 1310 to route the NAS message to the appropriate AMF 1321 as long as the temp ID is valid. The NG-RAN 1310 is aware of, and can reach, the AMF 1321 that is associated with the temp ID. Otherwise, the method for initial attach applies.

The NG-RAN 1310 supports resource isolation between slices. NG-RAN 1310 resource isolation may be achieved by means of RRM policies and protection mechanisms that should avoid that shortage of shared resources if one slice breaks the service level agreement for another slice. In some implementations, it is possible to fully dedicate NG-RAN 1310 resources to a certain slice. How NG-RAN 1310 supports resource isolation is implementation dependent.

Some slices may be available only in part of the network. Awareness in the NG-RAN 1310 of the slices supported in the cells of its neighbors may be beneficial for inter-frequency mobility in connected mode. The slice availability may not change within the UE's registration area. The NG-RAN 1310 and the 5GC 1320 are responsible to handle a service request for a slice that may or may not be available in a given area. Admission or rejection of access to a slice may depend on factors such as support for the slice, availability of resources, support of the requested service by NG-RAN 1310.

The UE 1301 may be associated with multiple network slices simultaneously. In case the UE 1301 is associated with multiple slices simultaneously, only one signaling connection is maintained, and for intra-frequency cell reselection, the UE 1301 tries to camp on the best cell. For inter-frequency cell reselection, dedicated priorities can be used to control the frequency on which the UE 1301 camps. The 5GC 1320 is to validate that the UE 1301 has the rights to access a network slice. Prior to receiving an Initial Context Setup Request message, the NG-RAN 1310 may be allowed to apply some provisional/local policies, based on awareness of a particular slice that the UE 1301 is requesting to access. During the initial context setup, the NG-RAN 1310 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 19:
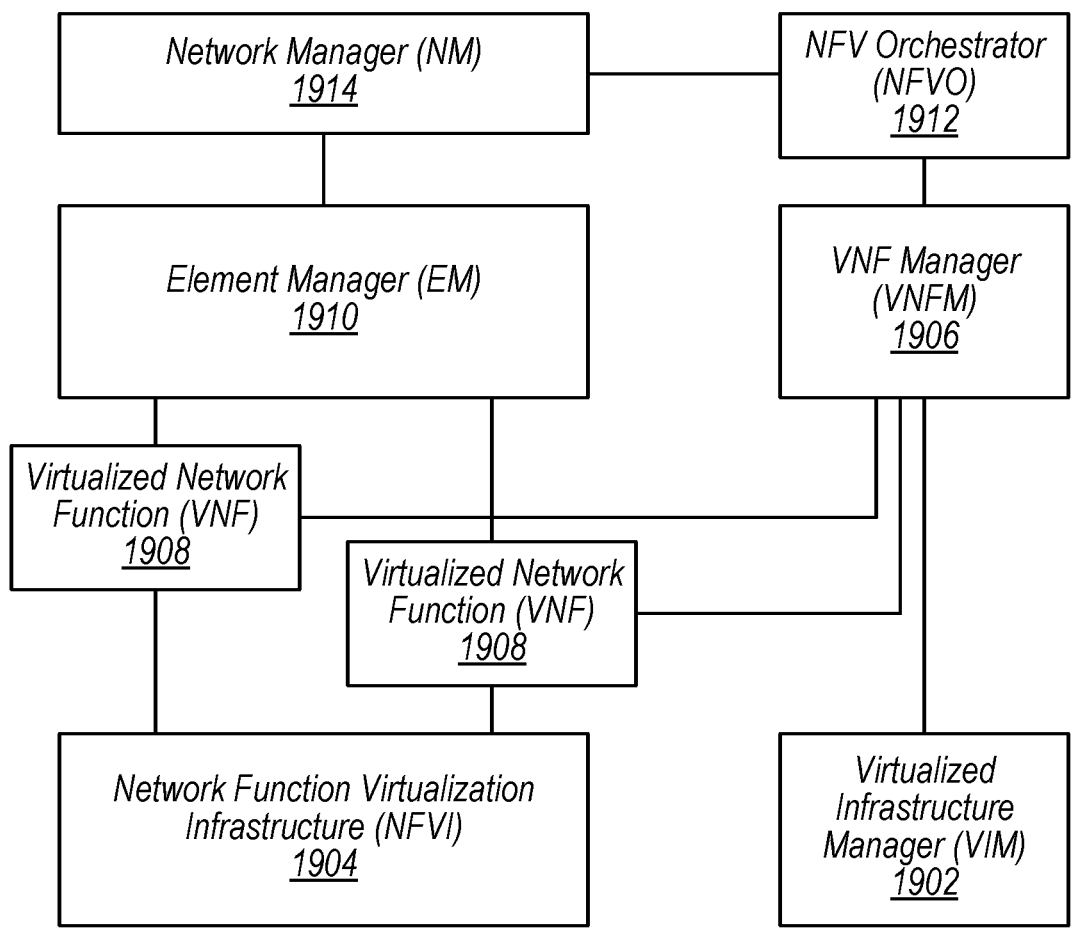
FIG. 19 is a block diagram illustrating components that may support a network virtualization function of a system, according to some embodiments.

FIG. 19 is a block diagram illustrating components, according to some example embodiments, of a system 1900 to support NFV. The system 1900 is illustrated as including a VIM 1902, an NFVI 1904, an VNFM 1906, VNFs 1908, an EM 1910, an NFVO 1912, and a NM 1914.

The VIM 1902 manages the resources of the NFVI 1904. The NFVI 1904 can include physical or virtual resources and applications (including hypervisors) used to execute the system 1900. The VIM 1902 may manage the life cycle of virtual resources with the NFVI 1904 (e.g., creation, maintenance, and tear down of VMs associated with one or more physical resources), track VM instances, track performance, fault and security of VM instances and associated physical resources, and expose VM instances and associated physical resources to other management systems.

The VNFM 1906 may manage the VNFs 1908. The VNFs 1908 may be used to execute EPC components/functions. The VNFM 1906 may manage the life cycle of the VNFs 1908 and track performance, fault and security of the virtual aspects of VNFs 1908. The EM 1910 may track the performance, fault and security of the functional aspects of VNFs 1908. The tracking data from the VNFM 1906 and the EM 1910 may comprise, for example, PM data used by the VIM 1902 or the NFVI 1904. Both the VNFM 1906 and the EM 1910 can scale up/down the quantity of VNFs of the system 1900.

The NFVO 1912 may coordinate, authorize, release and engage resources of the NFVI 1904 in order to provide the requested service (e.g., to execute an EPC function, component, or slice). The NM 1914 may provide a package of end-user functions with the responsibility for the management of a network, which may include network elements with VNFs, non-virtualized network functions, or both (management of the VNFs may occur via the EM 1910).

Figure 20:
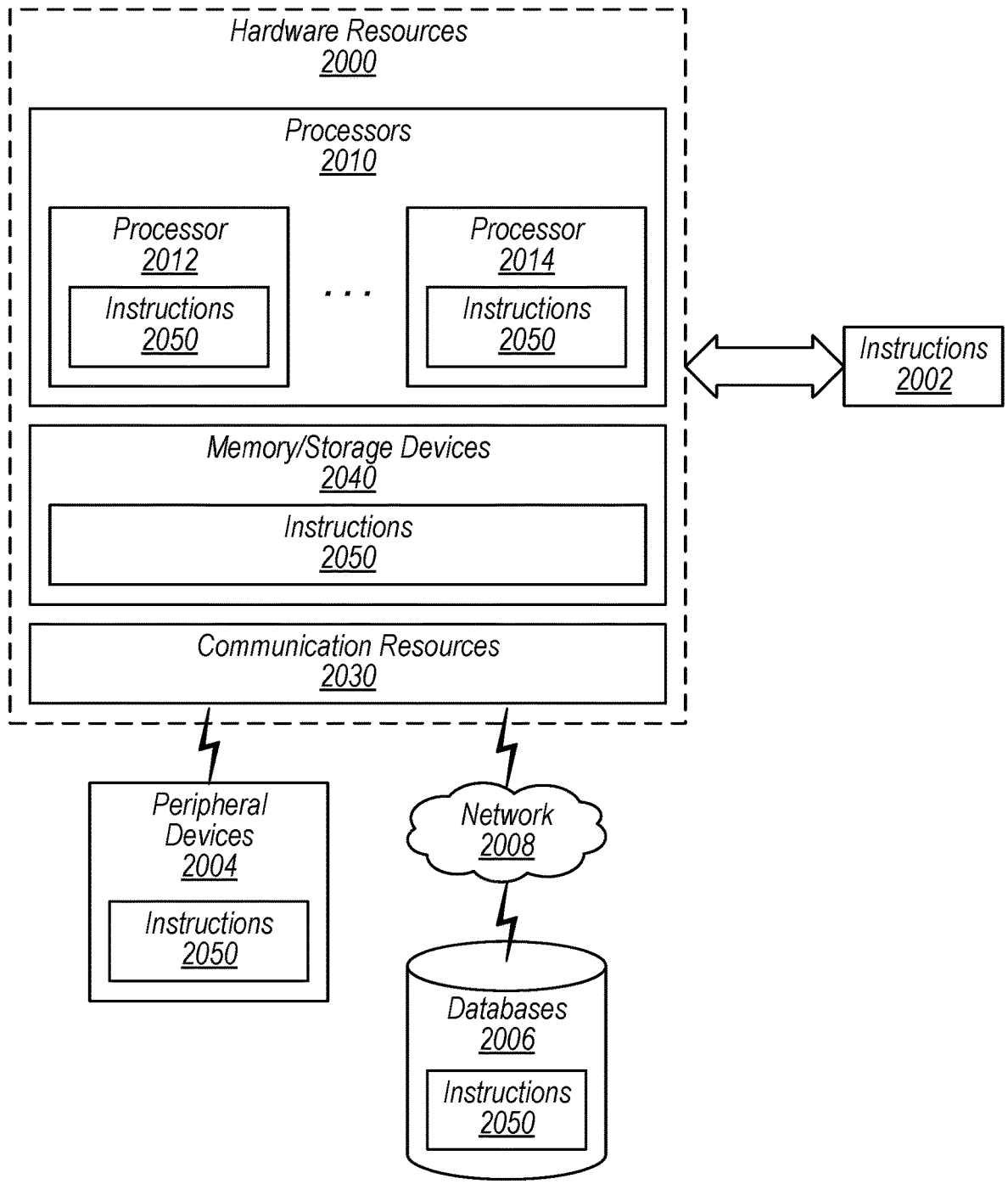
FIG. 20 is a block diagram illustrating components that may be able to read instructions from a machine-readable or computer-readable medium and perform any one or more of the methods described herein, according to some embodiments.

FIG. 20 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 20 shows a diagrammatic representation of hardware resources 2000 including one or more processors (or processor cores) 2010, one or more memory/storage devices 2020, and one or more communication resources 2030, each of which may be communicatively coupled via a bus 2040. For embodiments where node virtualization (e.g., NFV) is utilized, a hypervisor 2002 may be executed to provide an execution environment for one or more network slices/sub-slices to utilize the hardware resources 2000.

The processors 2010 may include, for example, a processor 2012 and a processor 2014. The processor(s) 2010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2020 may include main memory, disk storage, or any suitable combination thereof. The memory/storage devices 2020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2030 may include interconnection or network interface components or other suitable devices to communicate with one or more peripheral devices 2004 or one or more databases 2006 via a network 2008. For example, the communication resources 2030 may include wired communication components (e.g., for coupling via USB), cellular communication components, NFC components, Bluetooth® (or Bluetooth® Low Energy) components, Wi-Fi® components, and other communication components.

Instructions 2050 may comprise software, a program, an application, an applet, an app, or other executable code for causing at least any of the processors 2010 to perform any one or more of the methodologies discussed herein. The instructions 2050 may reside, completely or partially, within at least one of the processors 2010 (e.g., within the processor's cache memory), the memory/storage devices 2020, or any suitable combination thereof. Furthermore, any portion of the instructions 2050 may be transferred to the hardware resources 2000 from any combination of the peripheral devices 2004 or the databases 2006. Accordingly, the memory of processors 2010, the memory/storage devices 2020, the peripheral devices 2004, and the databases 2006 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
a wireless device,
receiving higher layer signaling that includes a parameter that indicates that dynamic switching between a bitmap based approach and a resource indication value (RIV) based approach for frequency domain resource allocation is enabled;
receiving an indication whether the bitmap based approach or RIV based approach will be used for frequency domain resource allocation;
receiving, based on the indication indicating that the RIV based approach will be used, an indication of a resource allocation for an uplink transmission on unlicensed spectrum in a 5G new radio (NR) wireless cellular network, wherein the indication includes a RIV that indicates a set of frequency domain resources allocated to the wireless device for the uplink transmission, wherein a frequency domain resource in the set of frequency domain resources corresponds to an interlace, where the interlace is a group of resource blocks that are separated in the frequency domain, and wherein when a total number of resource blocks is not divisible by a total number of interlaces; and transmitting one or more uplink (UL) signals based on the resource allocation.

2. The method of claim 1,
wherein to indicate the set of frequency domain resources allocated to the wireless device, the RIV indicates $RB_{START}$ and a number of allocated interlaces.

3. The method of claim 2,
wherein interlaces are indexed in order of resource block values, and wherein $RB_{START}=0$ corresponds to interlace index 0.

4. The method of claim 1,
wherein the set of frequency domain resources allocated to the wireless device include interlaces mapped onto guard bands.

5. The method of claim 1,
wherein the RIV based approach is indicated for smaller sub-carrier spacing (SCS) and the bitmap based approach is indicated for higher SCS.

6. The method of claim 5,
wherein an SCS is determined to be a smaller SCS when a bit-length of the RIV is less than a number of resource block groups configured; and
wherein an SCS is determined to be a larger SCS when the bit-length of the RIV would be equal to the number of resource block groups configured.

7. The method of claim 1,
wherein the parameter comprises a pusch-Config parameter.

8. The method of claim 1,
wherein the indication whether the bitmap based approach or the RIV based approach will be used for frequency domain resource allocation is comprised in a field of a downlink control information (DCI) that provides an uplink grant to the wireless device.

9. A method, comprising:
a network element,
transmitting, to a wireless device, higher layer signaling that includes a parameter that indicates that dynamic switching between a bitmap based approach and a resource indication value (RIV) based approach for frequency domain resource allocation is enabled;
transmitting an indication whether the bitmap based approach or the RIV based approach will be used for frequency domain resource allocation;
transmitting, to the wireless device and, based on the indication indicating that the RIV based approach will be used, an indication of a resource allocation for an uplink transmission on unlicensed spectrum in a 5G new radio (NR) wireless cellular network, wherein the indication includes a RIV that indicates a set of frequency domain resources allocated to the wireless device for the uplink transmission, wherein a frequency domain resource in the set of frequency domain resources corresponds to an interlace, where the interlace is a group of resource blocks that are separated in the frequency domain, and wherein when a total number of resource blocks is not divisible by a total number of interlaces; and
receiving, from the wireless device, one or more uplink (UL) signals based on the resource allocation.

10. The method of claim 9,
wherein to indicate the set of frequency domain resources allocated to the wireless device, the RIV indicates $RB_{START}$ and a number of allocated interlaces.

11. The method of claim 9,
wherein, when a number of resource block groups, $N_{RGB}$, are configured and the RIV is greater than or equal to 0 and less than a quantity defined by $N_{RGB}(N_{RGB}+1)/2$, the RIV is defined as a sum of $N_{RGB}(L-1)$ and $RB_{START}$ when (L−1) is less than or equal to floor ($N_{RGB}/2$), wherein L is a number of allocated interlaces.

12. The method of claim 9,
wherein the set of frequency domain resources allocated to the wireless device include interlaces mapped onto guard bands.

13. The method of claim 9,
wherein the RIV based approach is indicated for smaller sub-carrier spacing (SCS) and the bitmap based approach is indicated for higher SCS.

14. The method of claim 13,
wherein an SCS is determined to be a smaller SCS when a bit-length of the RIV is less than a number of resource block groups configured; and
wherein an SCS is determined to be a larger SCS when the bit-length of the RIV would be equal to the number of resource block groups configured.

15. The method of claim 9,
wherein the parameter comprises a pusch-Config parameter.

16. The method of claim 9,
wherein the indication whether the bitmap based approach or the RIV based approach will be used for frequency domain resource allocation is comprised in a field of a downlink control information (DCI) that provides an uplink grant to the wireless device.

17. A processor configured to cause a wireless device to:
receive higher layer signaling that includes a parameter that indicates that dynamic switching between a bitmap based approach and a resource indication value (RIV) based approach for frequency domain resource allocation is enabled;
receive an indication whether the bitmap based approach or the RIV based approach will be used for frequency domain resource allocation;
receive, based on the indication indicating that the RIV based approach will be used, an indication of a resource allocation for an uplink transmission on unlicensed spectrum in a 5G new radio (NR) wireless cellular network, wherein the indication includes a RIV that indicates a set of frequency domain resources allocated to the wireless device for the uplink transmission, wherein a frequency domain resource in the set of frequency domain resources corresponds to an interlace, where the interlace is a group of resource blocks that are separated in the frequency domain, and wherein when a total number of resource blocks is not divisible by a total number of interlaces; and
transmitting one or more uplink (UL) signals based on the resource allocation.

18. The processor of claim 17,
wherein the parameter comprises a pusch-Config parameter.

19. The processor of claim 17,
wherein the indication whether the bitmap based approach or the RIV based approach will be used for frequency domain resource allocation is comprised in a field of a downlink control information (DCI) that provides an uplink grant to the wireless device.

20. The processor of claim 17,
wherein, when dynamic switching is disabled, the processor is further configured to cause the wireless device to use to an approach indicated via the indication for frequency domain resource allocation.

* * * * *